(12) United States Patent
Yi et al.

(10) Patent No.: US 10,707,801 B2
(45) Date of Patent: Jul. 7, 2020

(54) ELECTRIC VEHICLE DRIVE SYSTEM AND ELECTRIC VEHICLE DRIVING METHOD

(71) Applicant: HUAWEI TECHNOLOGIES CO., LTD., Shenzhen, Guangdong (CN)

(72) Inventors: Jie Yi, Xi'an (CN); Jie Tang, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/225,209

(22) Filed: Dec. 19, 2018

(65) Prior Publication Data

US 2019/0123676 A1 Apr. 25, 2019

Related U.S. Application Data

(63) Continuation of application No. PCT/CN2017/076328, filed on Mar. 10, 2017.

(30) Foreign Application Priority Data

Jun. 22, 2016 (CN) .......................... 2016 1 0455615

(51) Int. Cl.
*H02P 27/08* (2006.01)
*B60L 50/50* (2019.01)
(Continued)

(52) U.S. Cl.
CPC .......... *H02P 27/08* (2013.01); *B60L 15/2045* (2013.01); *B60L 50/50* (2019.02); *B60L 50/51* (2019.02); *B60L 2210/14* (2013.01); *B60L 2210/40* (2013.01); *B60L 2210/42* (2013.01); *B60L 2240/12* (2013.01); *B60L 2240/421* (2013.01); *B60L 2240/423* (2013.01); (Continued)

(58) Field of Classification Search
CPC .............................. H02P 27/08; B60L 2240/12
USPC ................................ 318/400.26, 400.01, 700
See application file for complete search history.

(56) References Cited

U.S. PATENT DOCUMENTS 7,102,903 B2 * 9/2006 Nakamura .............. H02P 27/08
363/98
8,639,405 B2 * 1/2014 Yamada ................ B60L 15/025
701/22

(Continued)

FOREIGN PATENT DOCUMENTS

CN 101992678 A 3/2011
CN 202463602 U 10/2012
(Continued)

*Primary Examiner* — David Luo

(57) ABSTRACT

An electric vehicle drive system includes a power battery, a drive, a motor, a detection module, a torque reference module, and a controller, and the drive includes a filtering module, a first conversion module, a first capacitor, and a second conversion module. A positive electrode of the power battery is connected to an input end of the filtering module, and a first output end of the filtering module is connected to an alternating current end of the first conversion module. One end of the first capacitor is separately connected to direct current input ends of the first conversion module and the second conversion module, and the other end of the first capacitor is separately connected to direct current output ends of the first conversion module and the second conversion module and a negative electrode of the power battery.

14 Claims, 15 Drawing Sheets

(51) Int. Cl.
*B60L 50/51* (2019.01)
*B60L 15/20* (2006.01)

(52) U.S. Cl.
CPC ... *B60L 2240/427* (2013.01); *B60L 2240/429* (2013.01); *Y02T 10/7005* (2013.01); *Y02T 10/7022* (2013.01)

(56) References Cited

U.S. PATENT DOCUMENTS

| | | | |
|---|---|---|---|
| 9,000,711 B2 * | 4/2015 | Iwahori | B60L 15/007 318/800 |
| 2003/0146726 A1 | 8/2003 | Ishikawa et al. | |
| 2009/0090574 A1 | 4/2009 | Kuno | |
| 2009/0116266 A1 | 5/2009 | Lai et al. | |
| 2010/0026217 A1 | 2/2010 | Yoshida et al. | |
| 2010/0026218 A1 | 2/2010 | Ogino et al. | |
| 2010/0052583 A1 | 3/2010 | Takamatsu et al. | |
| 2011/0037320 A1 | 2/2011 | King et al. | |
| 2011/0075453 A1 | 3/2011 | Schugart | |
| 2013/0030621 A1 | 1/2013 | Chung et al. | |

FOREIGN PATENT DOCUMENTS

| | | |
|---|---|---|
| CN | 102897114 A | 1/2013 |
| CN | 103182948 A | 7/2013 |
| CN | 103434415 A | 12/2013 |
| CN | 102882459 B | 12/2014 |
| CN | 104753100 A | 7/2015 |
| CN | 104753430 A | 7/2015 |
| CN | 105098926 A | 11/2015 |
| CN | 204928277 U | 12/2015 |
| EP | 2017952 A1 | 1/2009 |
| JP | 2003235105 A | 8/2003 |
| JP | 2007330022 A | 12/2007 |
| JP | 2012135083 A | 7/2012 |
| KR | 20130056597 A | 5/2013 |
| WO | 2015043600 A1 | 4/2015 |
| WO | 2015111105 A1 | 7/2015 |

* cited by examiner

ELECTRIC VEHICLE DRIVE SYSTEM AND ELECTRIC VEHICLE DRIVING METHOD

CROSS-REFERENCE TO RELATED APPLICATIONS

This application is a continuation of International Application No. PCT/CN2017/076328, filed on Mar. 10, 2017, which claims priority to Chinese Patent Application No. 201610455615.2, filed on Jun. 22, 2016, The disclosures of the aforementioned applications are hereby incorporated by reference in their entireties.

TECHNICAL FIELD

Embodiments of the present invention relate to the field of electric vehicle technologies, and in particular, to an electric vehicle drive system and an electric vehicle driving method.

BACKGROUND

With improved environmental protection awareness of people, an environmentally friendly and energy-saving electric vehicle is playing a role as a replacement of an oil-fueled vehicle, and therefore, electric vehicle technologies rapidly develop. As the electric vehicle technologies develop, people impose a stricter requirement on working performance of a drive system in an electric vehicle. For example, the drive system needs to have a capability of a wide speed adjustment range. That is, the drive system needs to have a relatively high maximum speed.

Currently, referring to FIG. 1, a drive system used by an electric vehicle usually includes a power battery 110, a drive 120, and a motor 130. The drive 120 is connected to both the power battery 110 and the motor 130. The power battery 110 is configured to provide direct current energy, and the drive 120 is configured to: convert a direct current of the power battery 110 into an alternating current, and output the alternating current to the motor 130, so that the motor 130 outputs torque to drive the electric vehicle to travel. The drive 120 includes a bus capacitor C and a conversion module. The bus capacitor C is connected between a positive electrode and a negative electrode of the power battery 110, and is connected to the conversion module in parallel. The conversion module includes six switching transistors V1 to V6. The switching transistors V1 and V4 are connected in series, the switching transistors V3 and V6 are connected in series, and the switching transistors V5 and V2 are connected in series. The serially-connected switching transistors V1 and V4, the serially-connected switching transistors V3 and V6, and the serially-connected switching transistors V5 and V2 are separately connected between the positive electrode and the negative electrode of the power battery. In addition, a node A is extended between the serially-connected switching transistors V1 and V4, a node B is extended between the serially-connected switching transistors V3 and V6, a node C is extended between the serially-connected switching transistors V5 and V2, and the nodes A, B, and C are separately connected to a stator end of the motor 130, so as to output a three-phase alternating current to the motor 130. When the motor 130 runs at a high rotation speed, an end voltage of the motor 130 boosts with the rotation speed. When the end voltage of the motor 130 reaches a maximum voltage that can be output on a direct current side of the drive 120, the conversion module included in the drive 120 may be used to control, by means of field weakening control, the motor 130 to run at a higher rotation speed, that is, the conversion module included in the drive 120 may be used to weaken a magnetic field of the motor 130, so that a rotation speed of the motor 130 continues to boost. In this way, a wide rotation speed range of the electric vehicle is implemented.

When the motor runs at a high speed, in a process of performing field weakening control on the motor, if the magnetic field of the motor needs to be weakened, a direct-axis demagnetizing current component of the motor needs to be increased and a quadrature-axis demagnetizing current component of the motor needs to be reduced. That is, a reactive current component needs to be increased and an active current component needs to be reduced. Because the reactive current component of the motor is increased, a power factor of the motor is reduced. Consequently, output power of the drive system is reduced, and efficiency is reduced.

SUMMARY

To resolve the problems in the prior art, embodiments of the present invention provide an electric vehicle drive system and an electric vehicle driving method. The technical solutions are as follows:

According to a first aspect, an electric vehicle drive system is provided. The drive system includes at least a power battery, a drive, a motor, a detection module, a torque reference module, and a controller, and the drive includes a filtering module, a first conversion module, a first capacitor, and a second conversion module;

a positive electrode of the power battery is connected to an input end of the filtering module, a first output end of the filtering module is connected to an alternating current end of the first conversion module, and a second output end of the filtering module is connected to a negative electrode of the power battery;

a direct current input end of the first conversion module is separately connected to one end of the first capacitor and a direct current input end of the second conversion module, and the other end of the first capacitor, a direct current output end of the first conversion module, and a direct current output end of the second conversion module are separately connected to the negative electrode of the power battery; and an alternating current end of the second conversion module is connected to an input end of the motor, an output end of the motor is connected to a first input end of the detection module, a second input end of the detection module is connected to the one end of the first capacitor, a third input end of the detection module is connected to the positive electrode of the power battery, an output end of the detection module and an output end of the torque reference module are separately connected to an input end of the controller, and an output end of the controller is separately connected to a control end of the first conversion module and a control end of the second conversion module.

The power battery is configured to provide electric energy for the drive system, the torque reference module is configured to obtain reference torque of the motor, and the detection module is configured to obtain parameters such as a voltage of the power battery, a rotation speed of the motor, a voltage of the first capacitor, a stator current of the motor, and a rotor rotation angle of the motor. The controller is configured to: generate a first pulse-width modulation PWM signal based on the reference torque of the motor, the rotation speed of the motor, and the voltage of the power battery, and send the first PWM signal to the first conversion module, so as to control, by using the first conversion module, the filtering module to boost the voltage of the first capacitor. In addition, the controller is further configured to: generate a second PWM signal based on the parameters obtained by the detection module and the torque reference module, and send the second PWM signal to the second conversion module, so as to control the second conversion module to invert, into an alternating current, a direct current that is input by the first capacitor, and transfer the alternating current to the motor to drive the motor to speed up.

In the embodiments of the present invention, when the motor of an electric vehicle runs at a high rotation speed, and an end voltage of the motor boosts as the rotation speed of the motor increases and exceeds a voltage that can be supplied by the power battery, the voltage of the first capacitor is boosted by using a boost circuit including the filtering module and the first conversion module, so as to input a sufficient voltage into the motor to drive the motor to speed up, and expand a speed adjustment range of the electric vehicle. Because the motor is sped up by means of boosting without requiring field weakening control, output power of the system is increased, and driving efficiency is increased.

With reference to the first aspect, in a first possible implementation of the first aspect, the drive system further includes an input switching module and a first output switching module;

a first input end of the input switching module is connected to the positive electrode of the power battery, a first output end of the input switching module is connected to the input end of the filtering module, a second output end of the input switching module is separately connected to the direct current input end of the first conversion module, the one end of the first capacitor, and the direct current input end of the second conversion module;

a first input end of the first output switching module is connected to the alternating current end of the first conversion module, and an output end of the first output switching module is connected to the input end of the motor; and the output end of the controller is separately connected to a second input end of the input switching module and a second input end of the first output switching module.

Switching states of the input switching module and the first output switching module may be changed, so that the positive electrode of the power battery can be connected to the input end of the filtering module and open from the direct current input end of the first conversion module, and the alternating current end of the first conversion module can be open from the motor. In this way, the filtering module and the first conversion module in the drive system form the boost circuit to boost the voltage of the first capacitor, and the second conversion module inverts the boosted voltage into an alternating current, and transfers the alternating current to the motor. That is, the drive system works in a boosting inversion mode. Alternatively, the positive electrode of the power battery is open from the input end of the filtering module and connected to the direct current input end of the first conversion module, and the alternating current end of the first conversion module is connected to the motor, so that the first conversion module and the second conversion module form a parallel inverter circuit to separately invert, into the alternating current, the direct current that is input by the first capacitor, and transfer the alternating current to the motor, and parallelly drive the motor to speed up. That is, the drive system works in a parallel inversion mode. Alternatively, the positive electrode of the power battery is open from the input end of the filtering module and connected to the direct current input end of the first conversion module, and the alternating current end of the first conversion module is open from the motor, so that the first conversion module does not work, and only the second conversion module works in an inversion state to invert, into the alternating current, the direct current that is input by the first capacitor, and transfer the alternating current to the motor to drive the motor to speed up. That is, the drive system works in a single inversion mode.

In the embodiments of the present invention, the switching states of the input switching module and the first output switching module may be changed, so that the drive system can be switched between the boosting inversion mode, a parallel inversion mode, and the single inversion mode. In this way, different working requirements of the drive system are met, and the driving efficiency is increased. In the boosting inversion mode, the first conversion module works in a boosting state, and a speed adjustment range of the motor can be expanded. In the parallel inversion mode, the first conversion module works in the inversion state, and may form the parallel inverter circuit together with the second conversion module to parallelly drive the motor to speed up. Because a current that is input into the motor during parallel driving is twice a current that is input during driving by a single conversion module, a sufficient current can be input into the motor when the motor runs at a low speed. In this way, the motor outputs relatively large torque to speed up, so as to meet a requirement of the electric vehicle for a low speed and large torque. In the single inversion mode, the first conversion module does not work, and only the second conversion module works in the inversion state. In this way, system resources can be saved, and system running efficiency can be increased.

With reference to the first aspect, in a second possible implementation of the first aspect, the input switching module includes a first switch and a second switch; and one end of the first switch and one end of the second switch are separately connected to the positive electrode of the power battery, the other end of the first switch is connected to the input end of the filtering module, and the other end of the second switch is connected to the direct current input end of the first conversion module.

In the embodiments of the present invention, closing and opening of the first switch and the second switch are controlled, so that a working mode of the drive system can be switched. A control method is simple and easy to implement.

With reference to the first aspect, in a third possible implementation of the first aspect, the drive further includes a second output switching module;

a first input end of the second output switching module is connected to the alternating current end of the second conversion module, and an output end of the second output switching module is connected to the input end of the motor; and the output end of the controller is connected to a second input end of the second output switching module.

In the embodiments of the present invention, in a process in which the first conversion module and the second conversion module parallelly drive the motor, when the first conversion module is faulty, the first output switching module may disrupt a connection between the first conversion module and the motor; or when the second conversion module is faulty, the second output switching module disrupts a connection between the second conversion module and the motor, so as to implement redundancy control of the drive system, and increase security and reliability of the drive system.

With reference to the first aspect, in a fourth possible implementation of the first aspect, the drive system further includes a soft start module; and a first input end of the soft start module is connected to the positive electrode of the power battery, an output end of the soft start module is connected to an input end of the drive, and the output end of the controller is connected to a second input end of the soft start module.

The soft start module is configured to control the power battery to gradually charge the first capacitor, so as to avoid a risk that the capacitor is damaged when a relatively high voltage of the power battery is directly applied to a bus, and increase security and reliability of the system.

With reference to the first aspect, in a fifth possible implementation of the first aspect, the soft start module includes a third switch, a fourth switch, and a current-limiting resistor;

an input end of the third switch is connected to the positive electrode of the power battery, and an output end of the third switch is connected to the input end of the drive;

one end of the current-limiting resistor is connected to the positive electrode of the power battery, the other end of the current-limiting resistor is connected to an input end of the fourth switch, and an output end of the fourth switch is connected to the input end of the drive; and the output end of the controller is separately connected to a control end of the third switch and a control end of the fourth switch.

In the embodiments of the present invention, when the drive system is started, the controller may close the fourth switch, and open the third switch, so that the power battery gradually charges the first capacitor by using the current-limiting resistor. When the charging is completed, the controller opens the fourth switch, and closes the third switch, to ensure that the drive system normally runs. In this way, soft start of the drive system is implemented. This avoids a risk that the first capacitor is damaged when a relatively high voltage of the power battery is directly applied to the bus.

With reference to the first aspect, in a sixth possible implementation of the first aspect, the filtering module includes a second capacitor and N boost inductors, and N is a positive integer;

an input end of the second capacitor is connected to the positive electrode of the power battery, and an output end of the second capacitor is connected to the negative electrode of the power battery; and input ends of the N boost inductors are separately connected to the positive electrode of the power battery, and output ends of the N boost inductors are separately connected to the alternating current end of the first conversion module.

The second capacitor is configured to perform filtering on the voltage of the power battery, and the N boost inductors and the first conversion module may form a boost circuit, so as to boost the voltage of the first capacitor.

With reference to the first aspect, in a seventh possible implementation of the first aspect, the filtering module further includes N boost switches, and the N boost switches are one-to-one corresponding to the N boost inductors;

input ends of the N boost switches are separately connected to the output ends of the N boost inductors correspondingly, and output ends of the N boost switches are connected to the alternating current end of the first conversion module; and the output end of the controller is connected to control ends of the N boost switches.

In the embodiments of the present invention, when the first conversion module works in the inversion state, the controller may disable the N boost inductors, and disrupt a connection between the alternating current end of the first conversion module and the negative electrode of the power battery, so as to avoid a short circuit of the first conversion module.

With reference to the first aspect, in an eighth possible implementation of the first aspect, the first output switching module includes a three-phase switch, one end of the three-phase switch is connected to the alternating current end of the first conversion module, and the other end of the three-phase switch is connected to the input end of the motor.

In the embodiments of the present invention, closing and opening of the three-phase switch can be controlled, so that a working mode of the drive system can be switched. A control method is simple and easy to implement.

With reference to the first aspect, in a ninth possible implementation of the first aspect, the drive further includes a first constant current inductor and a second constant current inductor;

one end of the first constant current inductor is connected to the alternating current end of the first conversion module, and the other end of the first constant current inductor is connected to the input end of the motor; and one end of the second constant current inductor is connected to the alternating current end of the second conversion module, and the other end of the second constant current inductor is connected to the input end of the motor.

In the embodiments of the present invention, a constant current inductor is added between the conversion module and the motor, so that in a process in which the first conversion module and the second conversion module parallelly drive the motor to speed up, the first constant current inductor and the second constant current inductor can restrain a cross current between the first conversion module and the second conversion module. In this way, currents that are output by the first conversion module and the second conversion module at each phase are the same.

With reference to the first aspect, in a tenth possible implementation of the first aspect, the first conversion module uses a two-level three-phase full-bridge inverter circuit or a three-level three-phase full-bridge inverter circuit, and the second conversion module uses a two-level three-phase full-bridge inverter circuit or a three-level three-phase full-bridge inverter circuit.

In the embodiments of the present invention, the first conversion module may use the two-level three-phase full-bridge inverter circuit, or may use the three-level three-phase full-bridge inverter circuit. Correspondingly, the second conversion module may use the two-level three-phase full-bridge inverter circuit, or may use the three-level three-phase full-bridge inverter circuit. The first conversion module and the second conversion module have flexible structures and wide application ranges.

According to a second aspect, an electric vehicle driving method is provided. The method is applied to the drive system according to any implementation of the first aspect, and the method includes:

obtaining, by the torque reference module, reference torque of the motor, and obtaining, by the detection module, a voltage of the power battery, a rotation speed of the motor, a voltage of the first capacitor, a stator current of the motor, and a rotor rotation angle of the motor;

calculating, by the controller, a demand voltage of the motor based on the reference torque of the motor and the rotation speed of the motor;

when the demand voltage is greater than the voltage of the power battery, generating, by the controller, a first pulse-width modulation PWM signal based on the voltage of the power battery and the demand voltage, and sending the first PWM signal to the first conversion module, so as to control, by using the first conversion module, the filtering module to boost the voltage of the first capacitor to the demand voltage; and generating, by the controller, a second PWM signal based on the reference torque of the motor, the rotation speed of the motor, the voltage of the first capacitor, the stator current of the motor, and the rotor rotation angle of the motor, and sending the second PWM signal to the second conversion module, so as to control the second conversion module to invert, into an alternating current, a direct current that is input by the first capacitor, and transfer the alternating current to the motor to drive the motor to speed up.

In the embodiments of the present invention, when the demand voltage of the motor is greater than the voltage of the power battery, the drive system may boost the voltage of the first capacitor to the demand voltage by using a boost circuit including the filtering module and the first conversion module. The voltage of the first capacitor has been boosted to the demand voltage. Therefore, when the second conversion module inverts, into the alternating current, the direct current that is input by the first capacitor, and transfers the alternating current to the motor, the motor can be driven to continue to speed up, so as to expand a speed adjustment range of an electric vehicle. In addition, because the motor is sped up by means of boosting without requiring field weakening control, output power of the system is increased, and driving efficiency is increased.

With reference to the second aspect, in a first possible implementation of the second aspect, the generating, by the controller, a first pulse-width modulation PWM signal based on the voltage of the power battery and the demand voltage includes:

calculating, by the controller, a ratio of the demand voltage of the motor to the voltage of the power battery, and determining the ratio as a boost ratio of the drive system;

calculating a duty cycle of the first PWM signal according to the boost ratio; and generating the first PWM signal according to the duty cycle.

In the embodiments of the present invention, the controller may calculate the boost ratio between the demand voltage and the voltage of the power battery, and may generate the first PWM signal according to the boost ratio. Therefore, when the first PWM signal is sent to the first conversion module, the first conversion module may control the filtering module to accurately boost the voltage of the first capacitor to the demand voltage, so as to meet a driving requirement of the motor.

With reference to the second aspect, in a second possible implementation of the second aspect, when the drive system further includes the input switching module and the first output switching module, before the generating, by the controller, a first pulse-width modulation PWM signal based on the voltage of the power battery and the demand voltage, the method further includes:

switching, by the controller, the input switching module to a first switching state, and switching the first output switching module to a third switching state, where the first switching state is a state in which the positive electrode of the power battery is connected to the input end of the filtering module, and the positive electrode of the power battery is open from the direct current input end of the first conversion module, and the third switching state is a state in which the alternating current end of the first conversion module is open from the input end of the motor.

In the embodiments of the present invention, the controller controls the switching states of the input switching module and the first output switching module, so that the drive system can be switched to a boosting inversion mode. In this way, flexibility is increased.

With reference to the second aspect, in a third possible implementation of the second aspect, the method further includes:

when the demand voltage of the motor is less than or equal to the voltage of the power battery, switching, by the controller, the input switching module to a second switching state, and switching the first output switching module to a fourth switching state, where the second switching state is a state in which the positive electrode of the power battery is connected to the direct current input end of the first conversion module, and the positive electrode of the power battery is open from the input end of the filtering module, and the fourth switching state is a state in which the alternating current end of the first conversion module is connected to the input end of the motor;

generating, by the controller, the second PWM signal based on the reference torque of the motor, the rotation speed of the motor, the voltage of the first capacitor, the stator current of the motor, and the rotor rotation angle of the motor, and sending the second PWM signal to the first conversion module and the second conversion module; and controlling, by using the second PWM signal, the first conversion module to invert, into a first alternating current, the direct current that is input by the first capacitor, and output the first alternating current to the motor; and controlling, by using the second PWM signal, the second conversion module to invert, into a second alternating current, the direct current that is input by the first capacitor, and output the second alternating current to the motor, so that the first conversion module and the second conversion module parallelly drive the motor to speed up.

In the embodiments of the present invention, when the demand voltage of the motor is less than or equal to the voltage of the power battery, the switching state of the input switching module can be changed, so that the drive system is switched to a parallel inversion mode. That is, when the voltage of the power battery meets a driving requirement of the motor and does not need to be boosted, boosting is not performed on the drive system, so as to meet different working requirements of the drive system. In addition, because a current that is input into the motor during parallel driving is twice a current that is input during driving by a single conversion module, a sufficient current can be input into the motor when the motor runs at a low speed. In this way, the motor outputs relatively large torque to speed up, so as to meet a requirement of the electric vehicle for a low speed and large torque.

With reference to the second aspect, in a fourth possible implementation of the second aspect, the method further includes:

when the demand voltage of the motor is less than or equal to the voltage of the power voltage, calculating, by the controller, a demand stator current of the motor based on the reference torque of the motor;

when the demand stator current of the motor is less than or equal to a maximum output current of the second conversion module, switching, by the controller, the input switching module to the second switching state, and switching the first output switching module to the third switching state; and when the demand stator current of the motor is greater than the maximum output current of the second conversion module, switching, by the controller, the input switching module to the second switching state, and switching the first output switching module to the fourth switching state.

In the embodiments of the present invention, when the demand stator current of the motor is less than or equal to the maximum output current of the second conversion module, that is, when the drive system works in a low-speed and light-load working condition and a single conversion module can provide a sufficient driving current, the controller can change the switching states of the input switching module and the first output switching module, so that the first conversion module does not work, and only the second conversion module transfers the driving current to the motor to drive the motor to speed up. In addition, when the demand stator current of the motor is greater than the maximum output current of the second conversion module, that is, when the drive system works in a low-speed and heavy-load working condition and a single conversion module cannot provide a sufficient driving current, the controller can further change the switching states of the input switching module and the first output switching module, so that the drive system works in the parallel inversion mode to separately transfer the driving current to the motor to drive the motor to speed up. In the foregoing manner, different working requirements of the drive system can be met, and the driving efficiency can be increased.

With reference to the second aspect, in a fifth possible implementation of the second aspect, when the drive system further includes the second output switching module, the method further includes:

when the demand voltage of the motor is greater than the voltage of the power battery, switching, by the controller, the second output switching module to a fifth switching state, where the fifth switching state is a state in which the alternating current end of the second conversion module is connected to the input end of the motor; and in a process in which the first conversion module and the second conversion module parallelly drive the motor to speed up, when the first conversion module is faulty, switching, by the controller, the first output switching module to the third switching state, and when the second conversion module is faulty, switching, by the controller, the second output switching module to a sixth switching state, where the sixth switching state is a state in which the alternating current end of the second conversion module is open from the input end of the motor.

In the embodiments of the present invention, in a process in which the first conversion module and the second conversion module parallelly drive the motor, when the first conversion module is faulty, the first output switching module may disrupt a connection between the first conversion module and the motor; or when the second conversion module is faulty, the second output switching module disrupts a connection between the second conversion module and the motor, so as to implement redundancy control of the drive system, and increase security and reliability of the drive system.

With reference to the second aspect, in a sixth possible implementation of the second aspect, when the input switching module includes the first switch and the second switch, the switching, by the controller, the input switching module to a first switching state includes:

closing, by the controller, the first switch, and opening the second switch, so as to switch the input switching module to the first switching state; and correspondingly, the switching, by the controller, the input switching module to a second switching state includes:

opening, by the controller, the first switch, and closing the second switch, so as to switch the input switching module to the second switching state.

In the embodiments of the present invention, closing and opening of the first switch and the second switch can be controlled, so that the switching state of the input switching module can be changed. In this way, a working mode of the drive system is switched, and a control method is simple and easy to implement.

With reference to the second aspect, in a seventh possible implementation of the second aspect, the method further includes:

if the drive system includes the soft start module, when the drive is started, starting, by the controller, the soft start module, so as to control the power battery to gradually charge the first capacitor.

In the embodiments of the present invention, the first capacitor is gradually charged by using the soft start module, so as to avoid a risk that the first capacitor is damaged when a relatively high voltage of the power battery is directly applied to a bus, and increase security and reliability of the system.

The technical solutions provided in the embodiments of the present invention may include the following beneficial effects:

In the embodiments of the present invention, when the demand voltage of the motor is greater than the voltage of the power battery, the drive system may boost the voltage of the first capacitor to the demand voltage by using the boost circuit including the filtering module and the first conversion module. The voltage of the first capacitor has been boosted to the demand voltage. Therefore, when the second conversion module inverts, into the alternating current, the direct current that is input by the first capacitor, and transfers the alternating current to the motor, the motor can be driven to continue to speed up, so as to expand the speed adjustment range of the electric vehicle. In addition, because the motor is sped up by means of boosting without requiring field weakening control, the output power of the system is increased, and the driving efficiency is increased.

It should be understood that the foregoing general description and the following detailed description are merely examples for explanation, and do not limit the present invention.

DESCRIPTION OF EMBODIMENTS

To make the objectives, technical solutions, and advantages of this application clearer, the following further describes the implementations of this application in detail with reference to the accompanying drawings.

Figure 2:
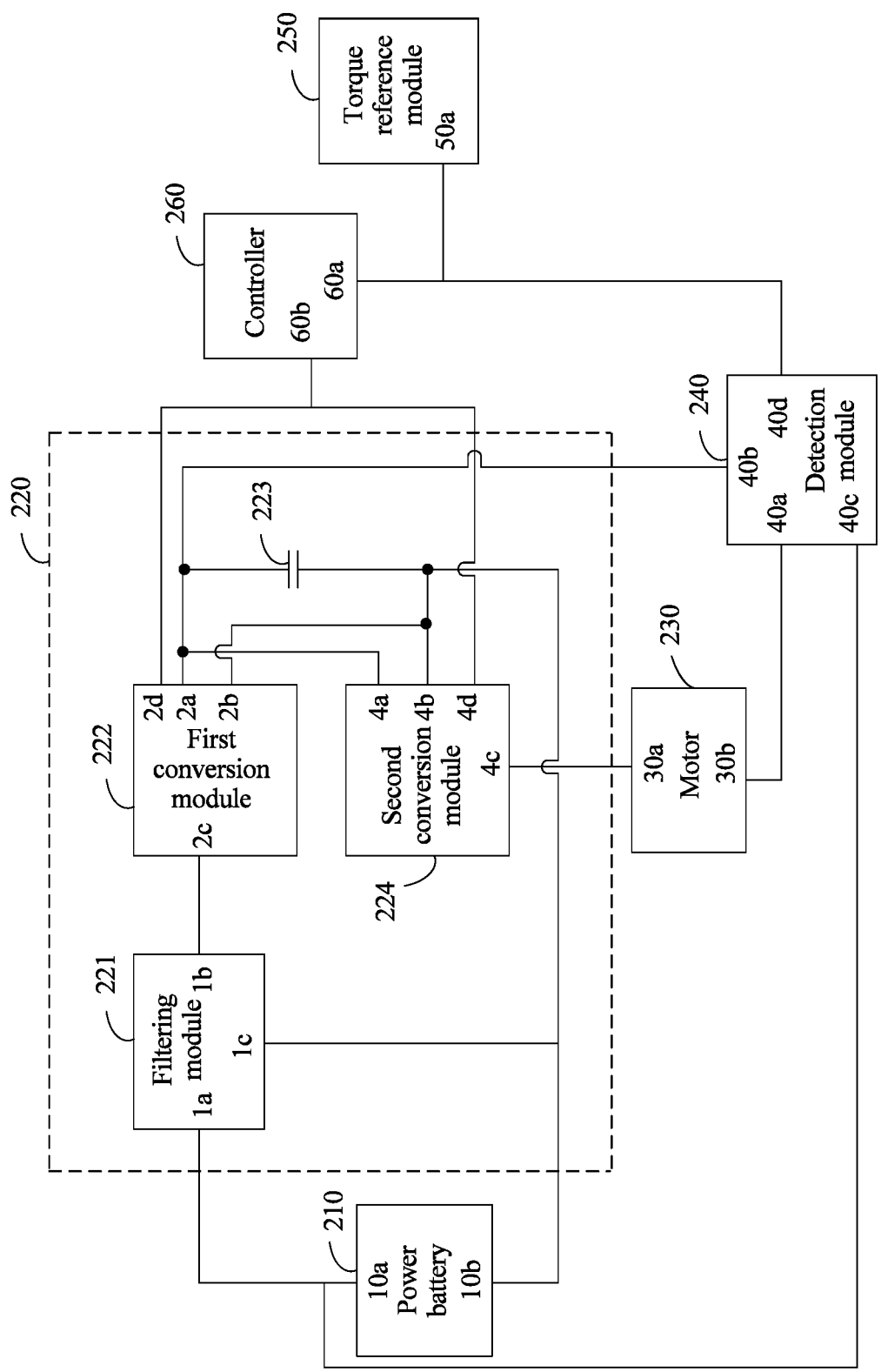
FIG. 2 is a schematic structural diagram of an electric vehicle drive system according to an embodiment of the present invention.

FIG. 2 is a schematic structural diagram of an electric vehicle drive system according to an embodiment of the present invention. Referring to FIG. 2, the drive system includes at least a power battery 210, a drive 220, a motor 230, a detection module 240, a torque reference module 250, and a controller 260, and the drive 220 includes a filtering module 221, a first conversion module 222, a first capacitor 223, and a second conversion module 224.

A positive electrode 10a of the power battery 210 is connected to an input end 1a of the filtering module 221, a first output end 1b of the filtering module 221 is connected to an alternating current end 2c of the first conversion module 222, and a second output end 1c of the filtering module 221 is connected to a negative electrode 10b of the power battery 210. A direct current input end 2a of the first conversion module 222 is separately connected to one end of the first capacitor 223 and a direct current input end 4a of the second conversion module 224, and the other end of the first capacitor 223, a direct current output end 2b of the first conversion module 222, and a direct current output end 4b of the second conversion module 224 are separately connected to the negative electrode 10b of the power battery 210. An alternating current end 4c of the second conversion module 224 is connected to an input end 30a of the motor 230, an output end 30b of the motor 230 is connected to a first input end 40a of the detection module 240, a second input end 40b of the detection module 240 is connected to the one end of the first capacitor 223, a third input end 40c of the detection module 240 is connected to the positive electrode 10a of the power battery 210, an output end 40b of the detection module 240 and an output end 50a of the torque reference module 250 are separately connected to an input end 60a of the controller 260, and an output end 60b of the controller 260 is separately connected to a control end 2d of the first conversion module 222 and a control end 4d of the second conversion module 224.

The power battery 210 is configured to provide electric energy for the drive system, and may be, for example, storage batteries. The detection module 240 is configured to detect parameters such as a voltage of the power battery, a rotation speed of the motor, a voltage of the first capacitor, a stator current of the motor, and a rotor rotation angle of the motor. Certainly, the detection module 240 may be further configured to detect another parameter such as a quantity of pole pairs of the motor or a permanent magnet chain of the motor. This is not limited in this embodiment of the present invention. The detection module 240 may include a rotor location sensor, and the drive system may obtain the rotor rotation angle of the motor by using the rotor location sensor. This is not limited in this embodiment of the present invention. The torque reference module 250 is configured to send reference torque to the controller 260, and the reference torque may be reference torque that is input into the motor 230 by using an accelerator system, that is, torque that needs to be input into the motor 230 under control of the accelerator system. The controller 260 is configured to: send a control signal to the drive 220 according to the parameters obtained by the detection module 240 and the torque reference module 250, and control the drive 220 to invert, into an alternating current, a direct current that is input by the power battery 210, and transfer the alternating current to the motor 230 to drive the motor 230 to speed up. The control signal may be a pulse-width modulation (PWM) signal or the like. This is not limited in this embodiment of the present invention.

Specifically, the drive 220 may include the filtering module 221, the first conversion module 222, the first capacitor 223, and the second conversion module 224. The filtering module 221 and the first conversion module 222 may form a boost circuit to boost the voltage of the first capacitor 223. After the voltage of the first capacitor 223 is boosted, the second conversion module 224 may invert, into an alternating current, a direct current that is input by the first capacitor 223, and transfer the alternating current to the motor 230 to drive the motor 230 to speed up.

Specifically, in a process in which the motor 230 runs, the controller 260 may obtain the rotation speed of the motor 230 by using the detection module 240, and obtain the reference torque of the motor 230 by using the torque reference module 250. In addition, the controller 260 may calculate a demand voltage of the motor 230 based on the rotation speed of the motor 230 and the reference torque of the motor 230, and compare the demand voltage with the voltage of the power battery 210. When determining that the demand voltage is greater than the voltage of the power battery 210, the controller 260 may generate a first PWM signal based on the voltage of the power battery 210 and the demand voltage, and send the first PWM signal to the first conversion module 222, so as to control, by using the first conversion module 222, the filtering module 221 to boost the voltage of the first capacitor 223 to the demand voltage. Afterwards, the controller 260 may generate a second PWM signal based on the reference torque of the motor 230, the rotation speed of the motor 230, the voltage of the first capacitor 223, the stator current of the motor 230, and the rotor rotation angle of the motor 230, and send the second PWM signal to the second conversion module 224, so as to control the second conversion module 224 to invert, into the alternating current, the direct current that is input by the first capacitor 223, and transfer the alternating current to the motor 230 to drive the motor to speed up.

In this embodiment of the present invention, when determining that the demand voltage of the motor 230 is greater than the voltage of the power battery 210, that is, when an end voltage of the motor 230 is greater than the voltage of the power battery 210, the controller 260 may send the first PWM signal to the first conversion module 222 to control the filtering module 221 to boost the voltage of the first capacitor 223 to the demand voltage, so that the second conversion module 224 outputs a sufficient output voltage to drive the motor to speed up. In this way, when the end voltage of the motor is greater than the voltage of the power battery, the motor is driven to continue to speed up, so as to expand a speed adjustment range of the electric vehicle. In addition, because the motor is sped up by means of boosting without requiring field weakening control, output power of the drive system is increased, and driving efficiency is increased.

Figure 1:
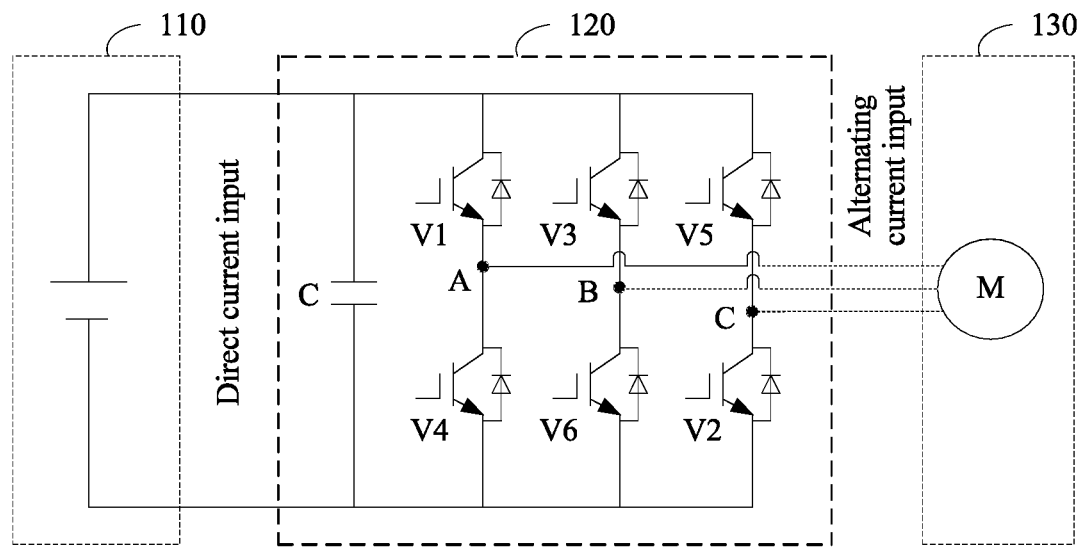
FIG. 1 is a schematic structural diagram of an electric vehicle drive system according to an embodiment of the present invention.

In the prior art, referring to FIG. 1, an input voltage of a conversion module is a voltage that is output by a power battery 110, a voltage of a bus capacitor C is a direct current bus voltage, the direct current bus voltage cannot be adjusted, and an output voltage of a drive 120 is determined by the direct current bus voltage. When a battery level of the power battery 110 is relatively low, the voltage that is output by the power battery 110 is reduced, and the direct current bus voltage is reduced. Therefore, the output voltage of the drive 120 is also reduced. A rotation speed of a motor 130 is determined by the output voltage of the drive 120. Therefore, when the output voltage of the drive 120 is reduced, both a highest rotation speed and output power that can be output by the motor 130 are reduced.

In this embodiment of the present invention, when an output voltage of the power battery 210 is reduced, the boost circuit may boost the voltage of the first capacitor 223, that is, may boost a direct current bus voltage. Therefore, an output voltage of the second conversion module 224, that is, an output voltage of the drive 220 is boosted accordingly, so as to drive the motor to continue to output a relatively high rotation speed.

In addition, referring to FIG. 1, when the motor 130 runs at a high rotation speed, an end voltage of the motor 130 boosts with the rotation speed of the motor 130. When the end voltage of the motor 130 is boosted to a value greater than a maximum voltage that can be output by the power battery 110, if the rotation speed of the motor 130 continues to be boosted by means of field weakening control, a field weakening current of the motor 130 boosts with the rotation speed of the motor 130, and an active current that can be provided is reduced due to a limitation of an output capability of the conversion module. Consequently, output power and output torque of the motor 130 are reduced. In addition, because a power factor of the motor 130 is relatively low under field weakening control, heat from the motor 130 is heavy, and efficiency of the entire drive system is also reduced.

In this embodiment of the present invention, when the end voltage of the motor 230 is boosted to a value greater than a maximum voltage that can be output by the power battery 210, the filtering module 221 and the first conversion module 222 may boost the voltage of the first capacitor 223 under control of the controller 260, so that the second conversion module 224 may output a greater voltage to the motor to drive the motor 230 to continue to speed up. In this way, the speed adjustment range of the electric vehicle is expanded. In addition, output power of the motor 230 gradually increases with the rotation speed of the motor 230. In this way, when the motor 230 runs at a high speed, relatively large power output and favorable torque performance can be maintained.

Figure 3:
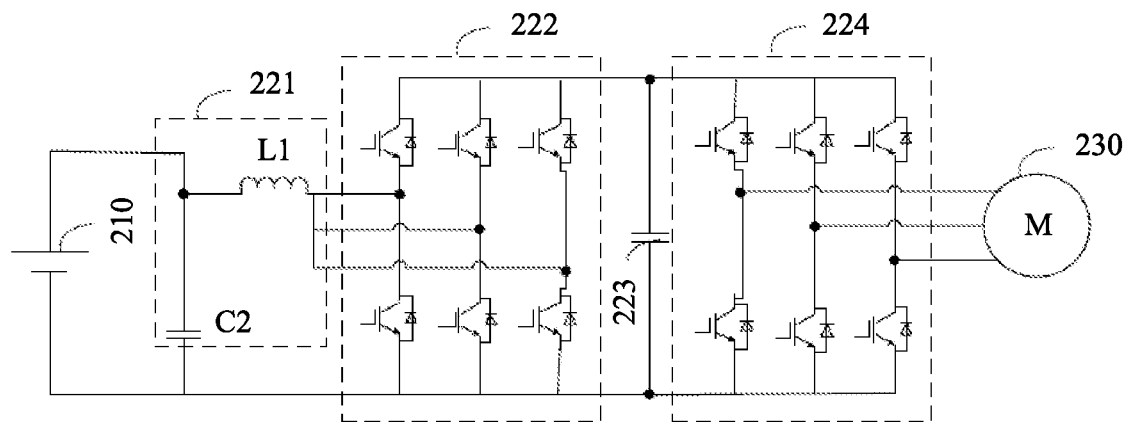
FIG. 3 is a schematic structural diagram of an electric vehicle drive system according to an embodiment of the present invention.

As shown in FIG. 3, the first conversion module 222 and the second conversion module 224 may use two-level three-phase full-bridge inverter circuits. Correspondingly, the control end of the first conversion module 222 is bases of six switching transistors in the first conversion module 222, and the control end of the second conversion module 224 is bases of six switching transistors in the second conversion module 224. The output end of the controller 260 is separately connected to the bases of the six switching transistors in the first conversion module 222, and the output end of the controller 260 is separately connected to the bases of the six switching transistors in the second conversion module 224, so as to send a PWM signal to the first conversion module 222 and the second conversion module 224. The PWM signal is a driving pulse signal, and can control closing and opening of the switching transistor.

The filtering module 221 may include a second capacitor C2 and N boost inductors L1, and N is a positive integer. An input end of the second capacitor C2 is connected to the positive electrode of the power battery 210, and an output end of the second capacitor C2 is connected to the negative electrode of the power battery 210. Input ends of the N boost inductors L1 are separately connected to the positive electrode of the power battery 210, and output ends of the N boost inductors L1 are separately connected to the alternating current end of the first conversion module 222.

For example, referring to FIG. 3, when N is 1, and the first conversion module 222 uses a two-level three-phase full-bridge inverter circuit, one end of the one boost inductor L1 is connected to the input end of the second capacitor C2, and the other end of the one boost inductor L1 is separately connected to three-phase alternating current ends of the first conversion module 222, that is, is separately connected to three bridge arm midpoints of the two-level three-phase full-bridge inverter circuit.

Figure 4:
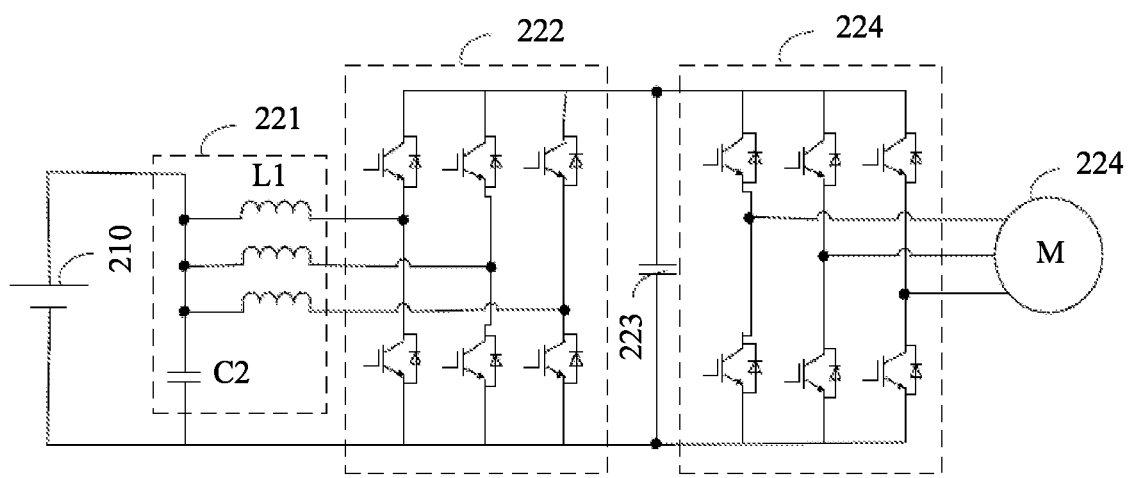
FIG. 4 is a schematic structural diagram of an electric vehicle drive system according to an embodiment of the present invention.

In addition, referring to FIG. 4, when N is 3, and the first conversion module 222 uses a two-level three-phase full-bridge inverter circuit, one end of each of the three boost inductors L1 is connected to the input end of the second capacitor C2, and the other ends of the three boost inductors L1 are separately connected to three-phase alternating current ends of the first conversion module 222 in a one-to-one correspondence manner, that is, are separately connected to three bridge arm midpoints of the two-level three-phase full-bridge inverter circuit in a one-to-one correspondence manner.

When N is 3, the three boost inductors L1 may also be connected to the three bridge arm midpoints of the first conversion module 222 in parallel in a staggered manner. In addition, the three boost inductors L1 and three bridge arms of the first conversion module 222 may form three parallel boost circuits. Therefore, when any bridge arm is faulty, the remaining bridge arms can continue to run, and this increases reliability of the drive system.

Figure 5:
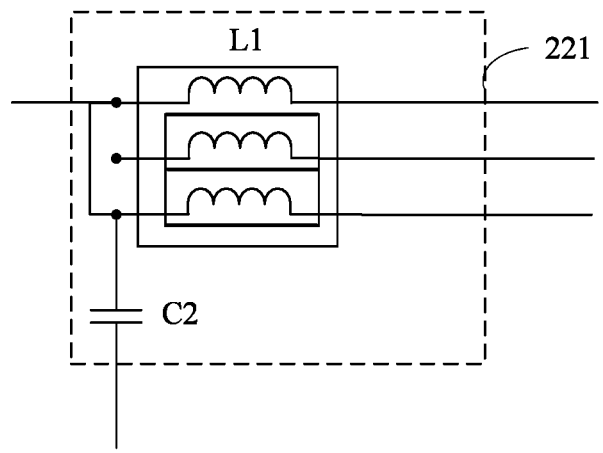
FIG. 5 is a schematic structural diagram of a filtering module according to an embodiment of the present invention.
Figure 6:
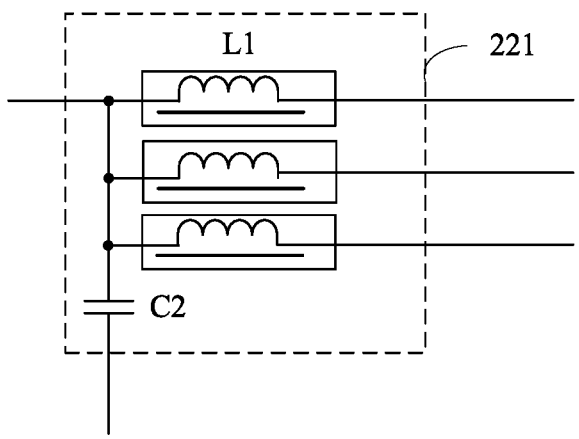
FIG. 6 is a schematic structural diagram of a filtering module according to an embodiment of the present invention.

When N is 3, the three boost inductors L1 may be of a structure that is shown in FIG. 5 and in which the three inductors are used as a whole, that is, a structure in which the three boost inductors share a magnetic core, or may be of a structure that is shown in FIG. 6 and in which the three inductors are separated, that is, a structure in which each of the three boost inductors uses one magnetic core. The structure in which the three inductors are used as a whole may be preferably selected due to a relatively small volume.

In this embodiment of the present invention, the N boost inductors L1 in the filtering module 221 and the two-level three-phase full-bridge inverter circuit in the first conversion module 222 may form a boost circuit, so as to boost the voltage of the first capacitor 223.

Figure 7:
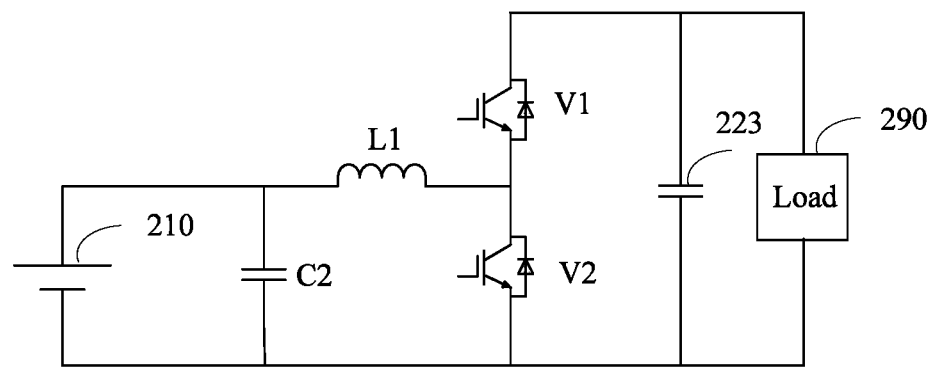
FIG. 7 is a schematic diagram of a boosting principle according to an embodiment of the present invention.

For example, referring to FIG. 4, a boosting principle is analyzed by using a bridge arm of one phase of the first conversion module 222 as an example, and a simplified circuit may be shown in FIG. 7. When V1 is open, and V2 is closed, the power battery 210 may charge the boost inductor L1, and a voltage pre-stored in the first capacitor 223 may be supplied to a load 290. When V1 is closed, and V2 is open, both the power battery 210 and the boost inductor L1 may charge the first capacitor 223, so as to boost the voltage of the first capacitor 223. The load 290 may be the second conversion module 224, and the second capacitor C2 is configured to perform filtering on the voltage of the power battery 210. In addition, pulses that are input into V1 and V2 are complementary. That is, a high level may be input into V1 and a low level may be input into V2 at a same time to control V1 to be open and control V2 to be closed, or a low level may be input into V1 and a high level may be input into V2 at a same time to control V1 to be closed and control V2 to be open. V2 is used as an example. If a closing time of V2 is ton and a opening time of V2 is toff in an on-off cycle, a ratio of the closing time to the opening time of V2 is controlled, so that a boost ratio of the first capacitor 223 can be controlled.

In addition, the controller 260 may input a three-phase driving pulse into the control end of the first conversion module 222 based on the boost circuit including the filtering module 221 and the first conversion module 222, so as to control the boost circuit to perform boosting. Moreover, the controller 260 may further control a duty cycle of the three-phase driving pulse, that is, control a closing time and a opening time of upper and lower switches of the bridge arm in the first conversion module 222, so as to control the boost ratio of the first capacitor 223. In this way, different boosting requirements are met. The second conversion module 224 may complete inversion from direct current input to alternating current output by means of space vector pulse-width modulation (Space Vector Pulse Width Modulation, SVPWM) control, and transfer an inverted alternating current to the motor 230 to drive the motor 230 to speed up.

Figure 8:
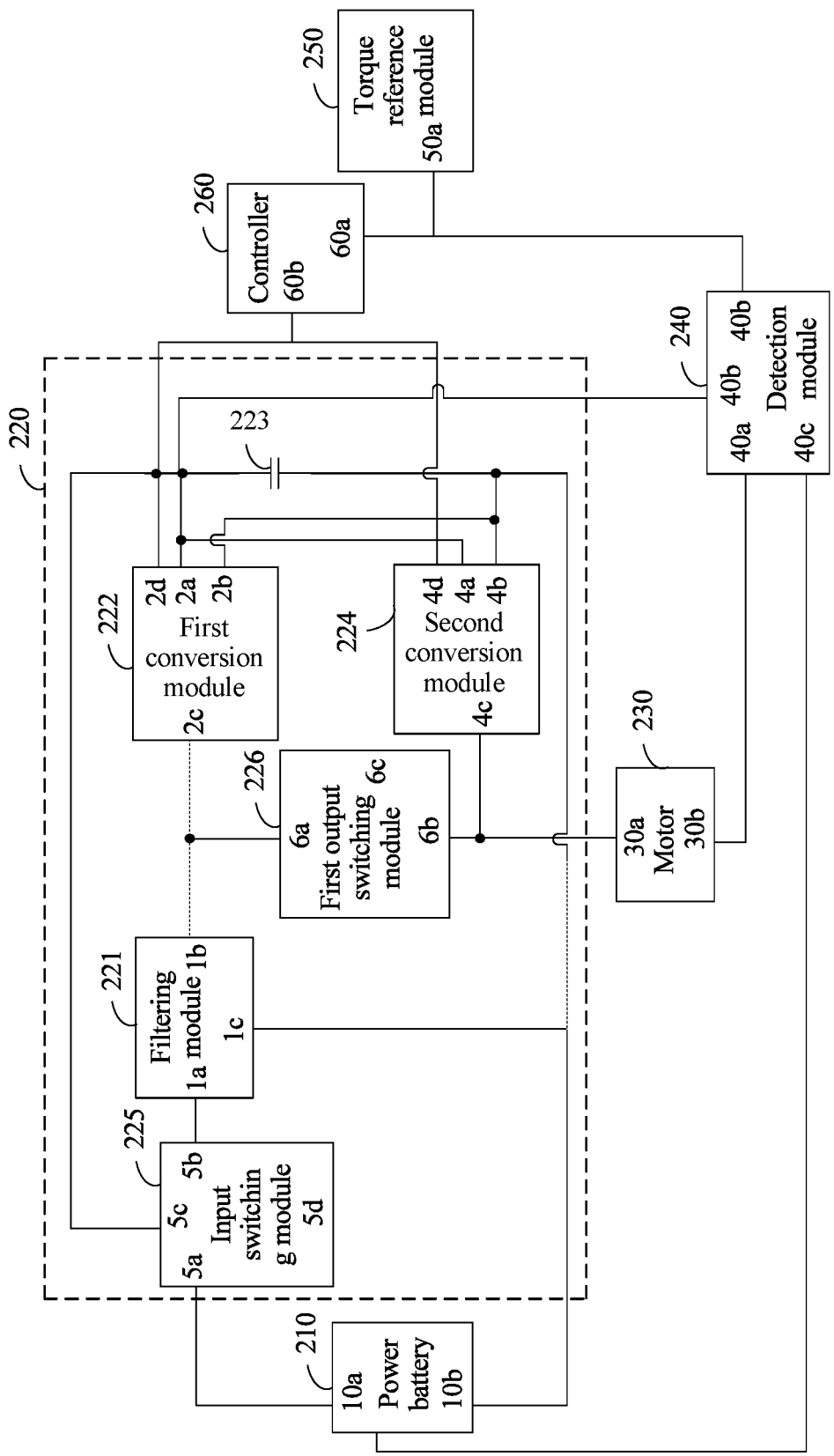
FIG. 8 is a schematic structural diagram of an electric vehicle drive system according to an embodiment of the present invention.

Further, referring to FIG. 8, the drive 220 may further include an input switching module 225 and a first output switching module 226.

A first input end 5a of the input switching module 225 is connected to the positive electrode 10a of the power battery 210, a first output end 5b of the input switching module 225 is connected to the input end 1a of the filtering module 221, a second output end 5c of the input switching module 225 is separately connected to the direct current input end 2d of the first conversion module 222, the one end of the first capacitor 223, and the direct current input end 4a of the second conversion module 224. A first input end 6a of the first output switching module 226 is connected to the alternating current end 2c of the first conversion module 222, and an output end 6b of the first output switching module 226 is connected to the input end 30a of the motor 230. The output end 60b of the controller 260 is separately connected to a second input end 5d of the input switching module 225 and a second input end 6c of the first output switching module 226.

It should be noted that, because a quantity of connection lines is relatively large, a connection line between the output end 60b of the controller 260 and the second input end 5d of the input switching module 225 and a connection line between the output end 60b of the controller 260 and the second input end 6c of the first output switching module 226 are not drawn in FIG. 8. However, actually, there is a connection relationship between the controller 260 and the input switching module 225, and there is a connection relationship between the controller 260 and the first output switching module 226, so as to control switching states of the input switching module 225 and the first output switching module 226.

A switching state of the input switching module 225 includes a first switching state and a second switching state. The first switching state is a state in which the positive electrode of the power battery 210 is connected to the input end of the filtering module 221, and the positive electrode of the power battery 210 is open from the direct current input end of the first conversion module 222. The second switching state is a state in which the positive electrode of the power battery 210 is open from the input end of the filtering module 221, and the positive electrode of the power battery 210 is connected to the direct current input end of the first conversion module 222.

A switching state of the first output switching module 226 includes a third switching state and a fourth switching state. The third switching state is a state in which the alternating current end of the first conversion module 222 is open from the input end of the motor 230, and the fourth switching state is a state in which the alternating current end of the first conversion module 222 is connected to the input end of the motor 230.

In this embodiment of the present invention, the controller 260 may change the switching states of the input switching module 225 and the first output switching module 226, so as to control the drive system to work in different working modes.

Figure 9:
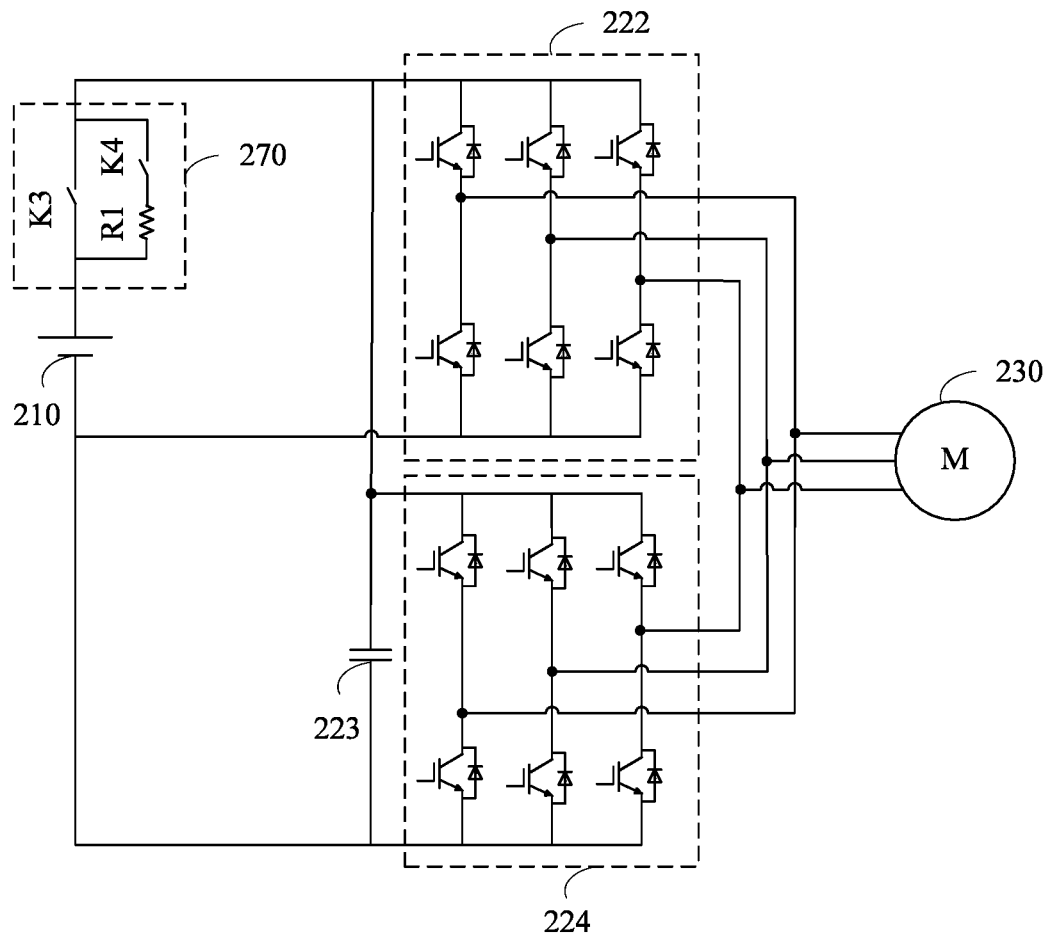
FIG. 9 is an equivalent circuit diagram in a parallel inversion mode according to an embodiment of the present invention.

Specifically, the controller 260 may switch the input switching module 225 to the first switching state, and switch the first output switching module 226 to the third switching state, so as to control the positive electrode of the power battery 210 to be connected to the input end of the filtering module 221, control the positive electrode of the power battery 210 to be open from the direct current input end of the first conversion module 222, and control the alternating current end of the first conversion module 222 to be open from the input end of the motor 230. In this way, the filtering module 221 and the first conversion module 222 in the drive system may form a boost circuit to boost the voltage of the first capacitor 223, and after the voltage of the first capacitor 223 is boosted, the second conversion module inverts, into the alternating current, the direct current that is input by the first capacitor 223, and transfers the alternating current to the motor 230. That is, the drive system works in a boosting inversion mode. For an equivalent circuit diagram in the boosting inversion mode, refer to FIG. 4. Alternatively, the controller 260 may switch the input switching module 225 to the second switching state, and switch the first output switching module 226 to the fourth switching state, so as to control the positive electrode of the power battery 210 to be open from the input end of the filtering module 221, control the positive electrode of the power battery 210 to be connected to the direct current input end of the first conversion module 222, and control the alternating current end of the first conversion module 222 to be connected to the input end of the motor 230. In this way, the first conversion module 222 and the second conversion module 224 in the drive system may form a parallel inverter circuit. In this case, the first conversion module 222 may invert, into a first alternating current, the direct current that is input by the first capacitor 223, and transfer the first alternating current to the motor 230. In addition, the second conversion module 224 may invert, into a second alternating current, the direct current that is input by the first capacitor 223, and transfer the second alternating current to the motor 230. That is, the first conversion module 222 and the second conversion module 224 may separately invert, into the alternating current, the direct current that is input by the first capacitor 223, and transfer the alternating current to the motor 230, so as to parallelly drive the motor 230 to speed up. In this way, the drive system works in a parallel inversion mode, and an equivalent circuit diagram in the parallel inversion mode is shown in FIG. 9.

In the parallel inversion mode, because the first conversion module 222 and the second conversion module 224 may parallelly output the current to the motor 230, an output current of the drive 220 is twice an output current of a single conversion module. Because output torque of the motor 230 is determined by the output current of the drive 220, the output torque of the motor 230 can also be doubled. Therefore, in this embodiment of the present invention, when the motor 230 runs at a low speed, the controller 260 may change the switching states of the input switching module 225 and the first output switching module 226, so as to control the drive system to work in the parallel inversion mode. In this way, the drive 220 can output a sufficient current to drive the motor 230 to output relatively large torque, so as to meet a requirement of the electric vehicle for a low speed and large torque. Therefore, the motor 230 can be sped up to a relatively high rotation speed in a relatively short time, so as to improve speedup performance of the electric vehicle.

Figure 10:
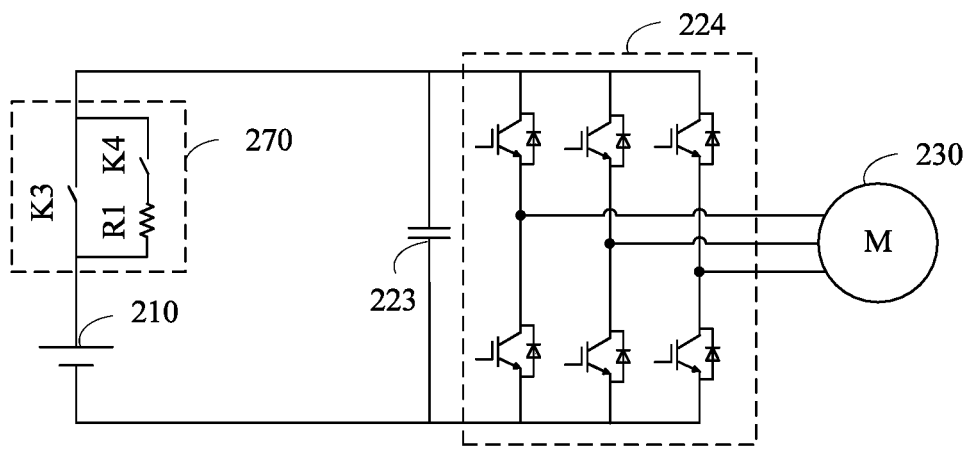
FIG. 10 is an equivalent circuit diagram in a single inversion mode according to an embodiment of the present invention.

Further, by using the controller 260, the drive system may further switch the input switching module 225 to the second switching state, and switch the first output switching module 226 to the third switching state, so as to control the positive electrode of the power battery 210 to be open from the input end of the filtering module 221, control the positive electrode of the power battery 210 to be connected to the alternating current end of the first conversion module 222, and control the alternating current end of the first conversion module 222 to be open from the motor 230. In this way, the first conversion module does not work, and it is ensured that only the second conversion module works in an inversion state, so as to invert, into the alternating current, the direct current that is input by the first capacitor 223, and transfer the alternating current to the motor 230 to drive the motor 230 to speed up. That is, the drive system works in a single inversion mode, and an equivalent circuit diagram in the single inversion mode is shown in FIG. 10.

In conclusion, in this embodiment of the present invention, the switching states of the input switching module 225 and the first output switching module 226 may be changed, so that the drive system can be switched between the boosting inversion mode, the parallel inversion mode, and the single inversion mode. In this way, different working requirements of the drive system are met, and driving efficiency is increased. In the boosting inversion mode, the first conversion module 222 works in a boosting state, the second conversion module 224 works in the inversion state, and a speed adjustment range of the motor 230 can be expanded by means of boosting. In the parallel inversion mode, the first conversion module 222 works in the inversion state, and the first conversion module 222 and the second conversion module 224 may form the parallel inverter circuit, so that the motor 230 outputs relatively large torque to speed up to meet a requirement of the electric vehicle for a low speed and large torque. In the single inversion mode, the first conversion module 222 does not work, and only the second conversion module 224 works in the inversion state, so as to save resources of the drive system, and increase running efficiency of the drive system.

In this embodiment of the present invention, in a process in which the drive system runs, the controller 260 may obtain collected information of the drive system that includes information such as the voltage of the power battery 210 and the rotation speed of the motor 230, and perform comprehensive analysis according to the collected information, so as to select a working mode that matches a current running state of the drive system, for example, the boosting inversion mode, the parallel inversion mode, or the single inversion mode. In a subsequent process, the controller 260 may switch the drive system to a corresponding working mode according to a selection result, so as to increase running efficiency of the drive system. For a specific process of selecting the matched working mode according to the collected information, refer to a method embodiment shown in FIG. 20. Details are not described in this embodiment of the present invention.

For example, the controller 260 may select the single inversion mode when the drive system runs in a low-speed and light-load working condition, select the parallel inversion mode when the drive system runs in a low-speed and heavy-load working condition, or select the boosting inversion mode when the drive system runs in a high-speed working condition. This is not limited in this embodiment of the present invention.

Further, in this embodiment of the present invention, when the drive system is switched to the boosting inversion mode, if the drive system runs with light load, and currently works in the single inversion mode, the single inversion mode may be directly switched to the boosting inversion mode. If the drive system runs with heavy load, and currently works in the parallel inversion mode, load reduction may be first performed on the first conversion module 222, and then the drive system may be switched to the boosting inversion mode.

Specifically, in a process of performing load reduction on the first conversion module 222, a duty cycle of the PWM signal sent to the first conversion module 222 may be controlled, so that an output voltage of the first conversion module 222 can be reduced, to reduce an output current of the first three-phase inverter unit 222. Sending of the PWM signal to the first conversion module 222 is stopped when the output current of the first three-phase inverter unit 222 is reduced to a value approaching zero, and then the drive system is switched to the boosting inversion mode. Load reduction is performed on the first conversion module 222, so as to reduce the output current of the first conversion module 222. This can avoid a shock that is of a great current to a closed switch in the input switching module and that is generated when the drive system is switched to the boosting inversion mode, so as to increase security of the drive system.

In addition, feedback braking of the electric vehicle may further be implemented by using the circuit structure in this embodiment of the present invention. Specifically, when the drive system is driven to run, the reference torque that is input by the torque reference module is a positive value, and the drive 220 can invert the direct current into the alternating current, and transfer the alternating current to the motor 230 to drive the motor 230 to rotate. When the electric vehicle slows down or brakes, the reference torque that is input by the torque reference module is a negative value, and the drive 220 can rectify energy on a motor 230 side to a direct current, and send the direct current to the power battery 210. A current direction of the drive system in this case is opposite to a current direction when the drive system is driven to run, and the energy on the motor 230 side may be fed back to the power battery 210, so as to charge the power battery 210.

Therefore, when the electric vehicle slows down or brakes, the drive system may drive the motor 230 to work in a power generation state. Energy of the first conversion module 222 and that of the second conversion module 224 are controlled to reversely flow, so as to charge the power battery 210 to implement braking energy feedback. In this way, energy of the drive system can be saved, and endurance mileage of the electric vehicle can be extended.

Figure 11:
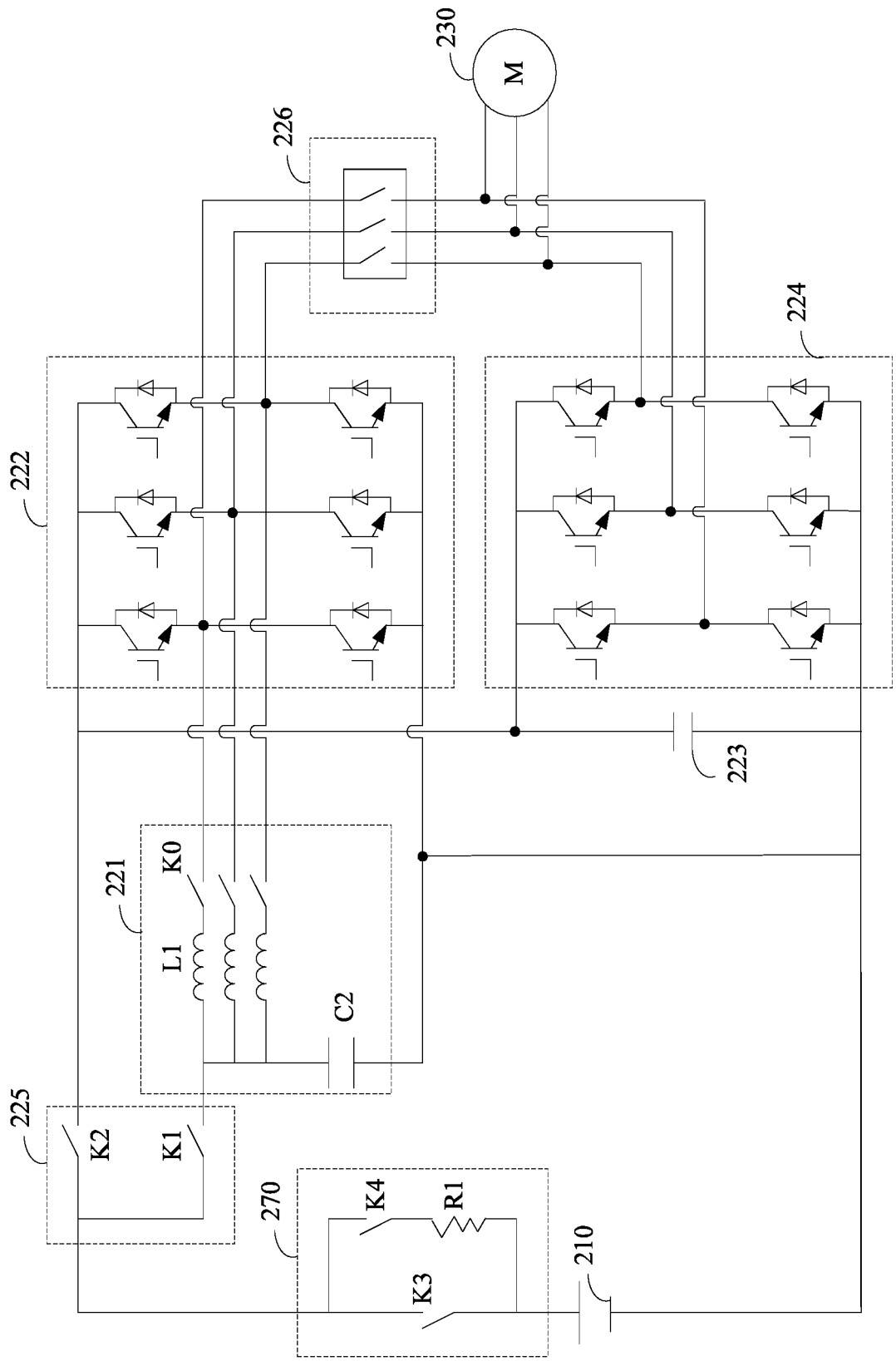
FIG. 11 is a schematic structural diagram of an electric vehicle drive system according to an embodiment of the present invention.

Referring to FIG. 11, the input switching module 225 may include a first switch K1 and a second switch K2. One end of the first switch K1 and one end of the second switch K2 are separately connected to the positive electrode of the power battery 210, the other end of the first switch K1 is connected to the input end of the filtering module 221, and the other end of the second switch K2 is connected to the direct current input end of the first conversion module 222. Correspondingly, the controller 260 may close the first switch K1, and open the second switch K2, so as to switch the input switching module 225 to the first switching state. Alternatively, the controller 260 may open the first switch K1, and close the second switch K2, so as to switch the input switching module 225 to the second switching state.

The first switch K1 and the second switch K2 may be electronic switches such as thyristors, transistors, field effect transistors, silicon controlled thyristors, or relays. The controller 260 may be separately connected to control ends of the first switch K1 and the second switch K2, so as to control closing and opening of the first switch K1 and the second switch K2 by means of current driving or voltage driving. In an example in which the first switch K1 is a field effect transistor, the control end of the first switch K1 is a gate of the field effect transistor. The controller 260 may input a high level or a low level to the control end of the first switch K1, so as to control closing and opening of the first switch K1.

In addition, referring to FIG. 11, the first output switching module 226 may include a three-phase switch. One end of the three-phase switch is separately connected to three-phase alternating current output ends of the first conversion module 222 correspondingly, and the other end of the three-phase switch is separately connected to three-phase alternating current input ends of the motor 230. The output end of the controller 260 may be connected to a control end of the three-phase switch, and closing and opening of the three-phase switch are controlled. The drive system may open the three-phase switch by using the controller 260 to switch the first output switching module 226 to the third switching state. Correspondingly, the drive system may close the three-phase switch by using the controller 260 to switch the first output switching module 226 to the fourth switching state.

For a form of the three-phase switch, refer to description of the first switch. Details are not described in this embodiment of the present invention again.

Optionally, referring to FIG. 11, the filtering module 221 further includes N boost switches K0, and the N boost switches K0 are one-to-one corresponding to the N boost inductors L1. Input ends of the N boost switches K0 are separately connected to output ends of the N boost inductors L1 correspondingly, output ends of the N boost switches K0 are connected to the alternating current end of the first conversion module 222, and the output end of the controller 260 is connected to control ends of the N boost switches K0.

For forms and control manners of the N boost switches, refer to description of the first switch. Details are not described in this embodiment of the present invention again.

In this embodiment of the present invention, when working in the boosting inversion mode, the drive system further needs to close the N boost switches K0 by using the controller 260. In addition, when the drive system works in the parallel inversion mode or the single inversion mode, the drive system further needs to open the N boost switches K0 by using the controller 260, to avoid a short circuit of the first three-phase inverter unit 222 caused by connection of the alternating current end of the first three-phase inverter unit 222 to the negative electrode of the power battery 210 that is performed by using the filtering module 221.

Figure 12:
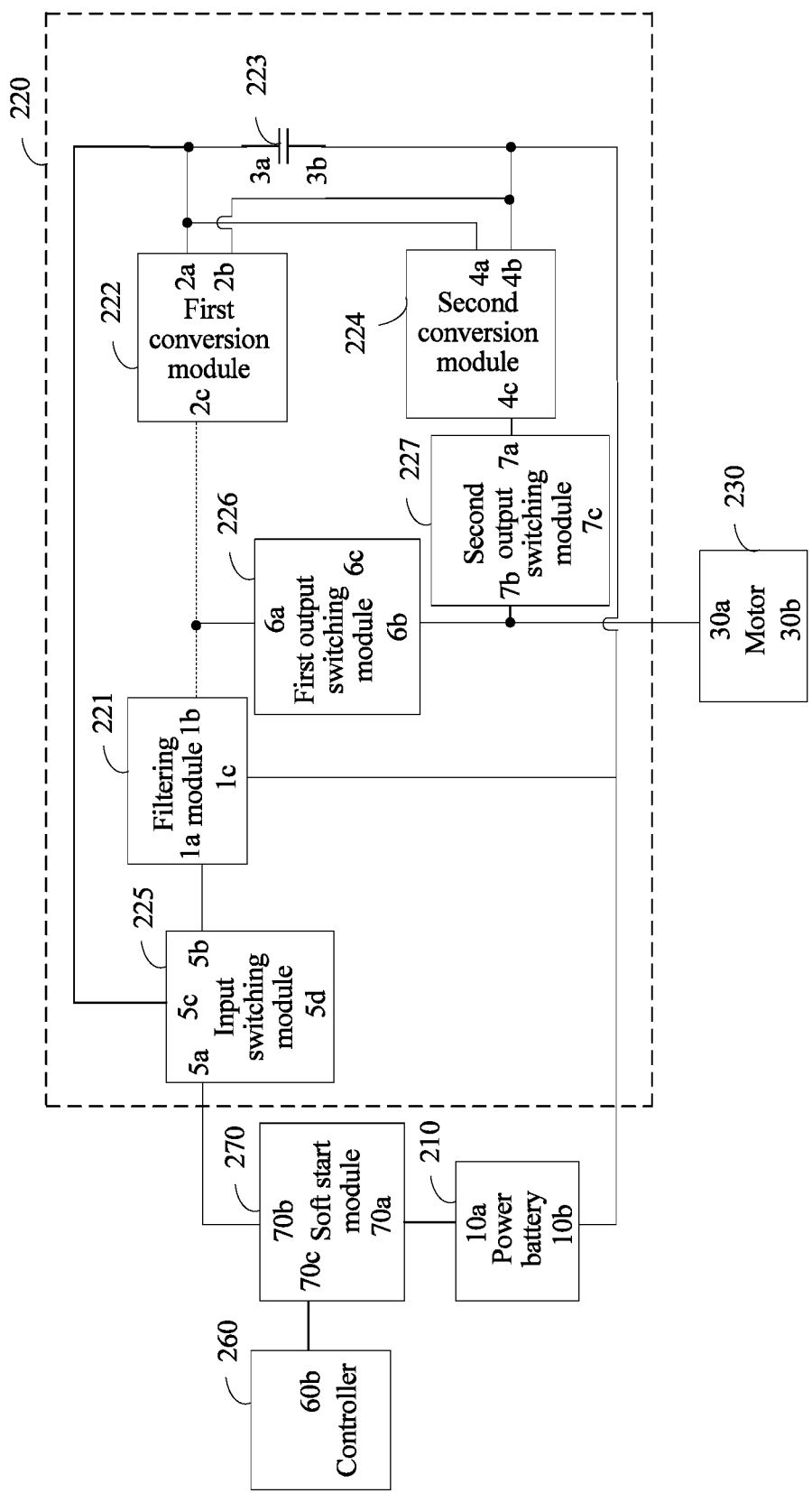
FIG. 12 is a schematic structural diagram of an electric vehicle drive system according to an embodiment of the present invention.

Optionally, referring to FIG. 12, the drive 220 may further include a second output switching module 227.

A first input end 7a of the second output switching module 227 is connected to the alternating current end 4c of the second conversion module 224, and an output end 7b of the second output switching module 227 is connected to the input end 30a of the motor 230. The output end 60b of the controller 260 is connected to a second input end 7c of the second output switching module 227.

A switching state of the second output switching module 227 includes a fifth switching state and a sixth switching state. The fifth switching state is a state in which the alternating current end of the second conversion module 224 is connected to the input end of the motor 230, and the sixth state is a state in which the alternating current end of the second conversion module 224 is open from the input end of the motor 230.

When the drive 220 further includes the second output switching module 227, based on the single inversion mode, the drive system further needs to switch the second output switching module 227 to the fifth switching state by using the controller 260. In addition, by using the controller 260, the drive system may further switch the input switching module 225 to the second switching state, switch the first output switching module 226 to the fourth switching state, and switch the second output switching module 227 to the sixth switching state, so that the drive system works in the single inversion mode. In this case, the positive electrode of the power battery 210 is open from the input end of the filtering module 221, the positive electrode of the power battery 210 is connected to the alternating current end of the first conversion module 222, the alternating current end of the first conversion module 222 is connected to the motor 230, and the alternating current end of the second conversion module 224 is open from the motor 230. Therefore, the second conversion module 224 does not work, and only the first conversion module 222 works in the inversion state, so as to invert, into the alternating current, the direct current that is input by the first capacitor 223, and transfer the alternating current to the motor 230 to drive the motor 230 to speed up.

In conclusion, the second output switching module 227 is added between the second conversion module 224 and the motor 230, so that the controller 260 may switch the first output switching module 226 to the third switching state, and switch the second output switching module 227 to the fifth switching state, to switch the drive system to the single inversion mode. Alternatively, the controller 260 may switch the first switching module 226 to the fourth switching state, and switch the second output switching module 227 to the sixth switching state, to switch the drive system to the single inversion mode. In this way, switching of the single inversion mode of the drive system is more flexible.

In addition, in a process in which the first conversion module 222 and the second conversion module 224 parallelly drive the motor 230, when the first conversion module 222 is faulty, the controller 260 may further disrupt a connection between the first conversion module 222 and the motor 230 by using the first output switching module 226; or when the second conversion module 224 is faulty, the controller 260 disrupts a connection between the second conversion module 224 and the motor 230 by using the second output switching module 227, so as to implement redundancy control of the drive system, and increase security and reliability of the drive system. By means of redundancy control, in a process in which the electric vehicle travels, the vehicle is not out of control and can still safely travel after speed reduction and load reduction if a fault occurs.

The controller 260 may switch the first output switching module 226 to the third switching state, so as to disrupt the connection between the first conversion module 222 and the motor 230. Correspondingly, the controller 260 may switch the second output switching module 227 to the sixth switching state, so as to disrupt the connection between the second conversion module 224 and the motor 230.

Figure 13:
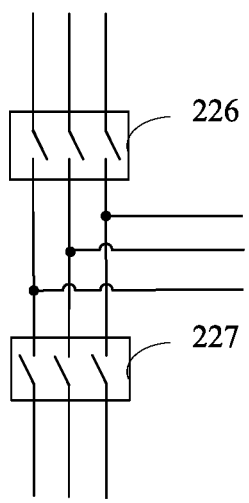
FIG. 13 is a schematic structural diagram of a first output switching module and a second output switching module according to an embodiment of the present invention.

Referring to FIG. 13, the second output switching module 227 may also include a three-phase switch. One end of the three-phase switch is separately connected to three-phase alternating current output ends of the second conversion module 224 correspondingly, and the other end of the three-phase switch is separately connected to the three-phase alternating current input ends of the motor 230. For a specific switch form and control manner of the three-phase switch, refer to description of the first output switching module 226. Details are not described in this embodiment of the present invention again.

Figure 14:
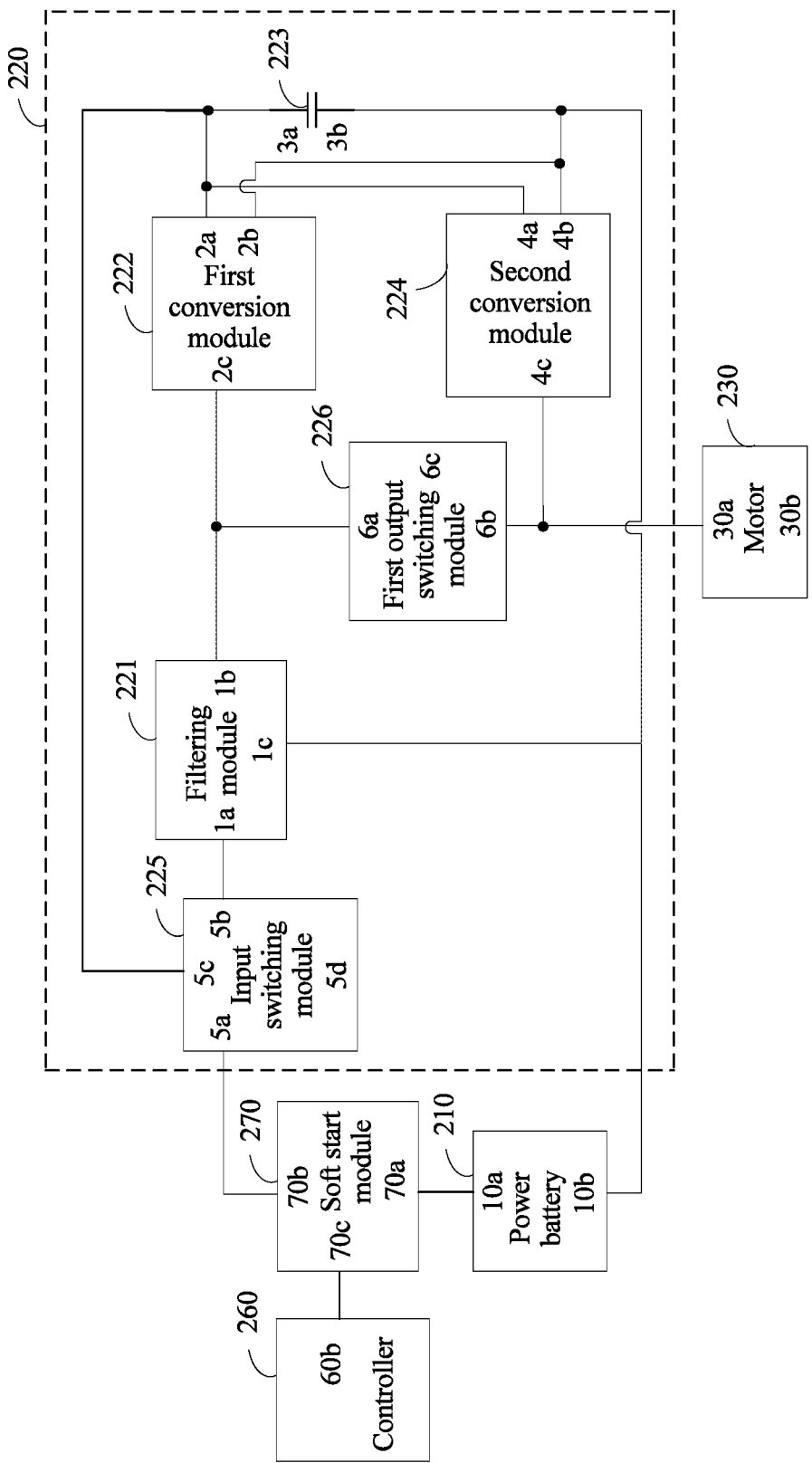
FIG. 14 is a schematic structural diagram of an electric vehicle drive system according to an embodiment of the present invention.

Optionally, referring to FIG. 14, the drive system may further include a soft start module 270.

A first input end 70a of the soft start module 270 is connected to the positive electrode 10a of the power battery 210, an output end 70b of the soft start module 270 is connected to an input end of the drive 220, and the output end 60b of the controller 260 is connected to a second input end 70c of the soft start module 270.

When the drive 220 does not include the input switching module 225, the input end of the drive may be the input end 1a of the filtering module. That is, the output end 70b of the soft start module 270 may be connected to the input end 1a of the filtering module 221. When the drive 220 includes the input switching module 225, the input end of the drive 220 may be the first input end 5a of the input switching module 225. That is, the output end 70b of the soft start module 270 may be connected to the first input end 5a of the input switching module 225. That the output end 70b of the soft start module 270 is connected to the first input end 5a of the input switching module 225 is merely used as an example in FIG. 14.

The soft start module 270 is configured t when the drive system is started, control the power battery 210 to gradually charge the first capacitor 223, so as to avoid a risk that the first capacitor 223 is damaged when a relatively great voltage of the power battery 210 is directly applied to a bus, and increase security and reliability of the system.

Specifically, referring to FIG. 11, the soft start module 270 includes a third switch K3, a fourth switch K4, and a current-limiting resistor R1. An input end of the third switch K3 is connected to the positive electrode of the power battery 210, and an output end of the third switch K3 is connected to the input end of the drive 220. One end of the current-limiting resistor R1 is connected to the positive electrode of the power battery 210, the other end of the current-limiting resistor R1 is connected to an input end of the fourth switch K4, and an output end of the fourth switch K4 is connected to the input end of the drive 220. The output end of the controller 260 is separately connected to a control end of the third switch K3 and a control end of the fourth switch K4.

In this embodiment of the present invention, when the drive system is started, the controller 260 closes the fourth switch K4, and opens the third switch K3, so that the power battery 210 can gradually charge the first capacitor 223 by using the current-limiting resistor R3. When the charging is completed, the controller 260 opens the fourth switch K4, and closes the third switch K3, to ensure that the drive system normally runs. In this way, soft start of the drive system is implemented. This avoids a risk that the first capacitor 223 is damaged when a relatively high voltage of the power battery is directly applied to the bus.

In a process in which the power battery 210 gradually charges the first capacitor 223 by using the current-limiting resistor R3, the controller 260 may obtain the voltage of the power battery 210 and the voltage of the first capacitor 223 by using the detection module 240. After detecting that the voltage of the first capacitor 223 approaches the voltage of the power battery 210, for example, reaches a preset percentage of the voltage of the power battery 210, the controller 260 determines that charging of the first capacitor 223 is completed. The preset percentage may be 80%, 90%, 95%, or the like. This is not limited in this embodiment of the present invention.

Figure 15:
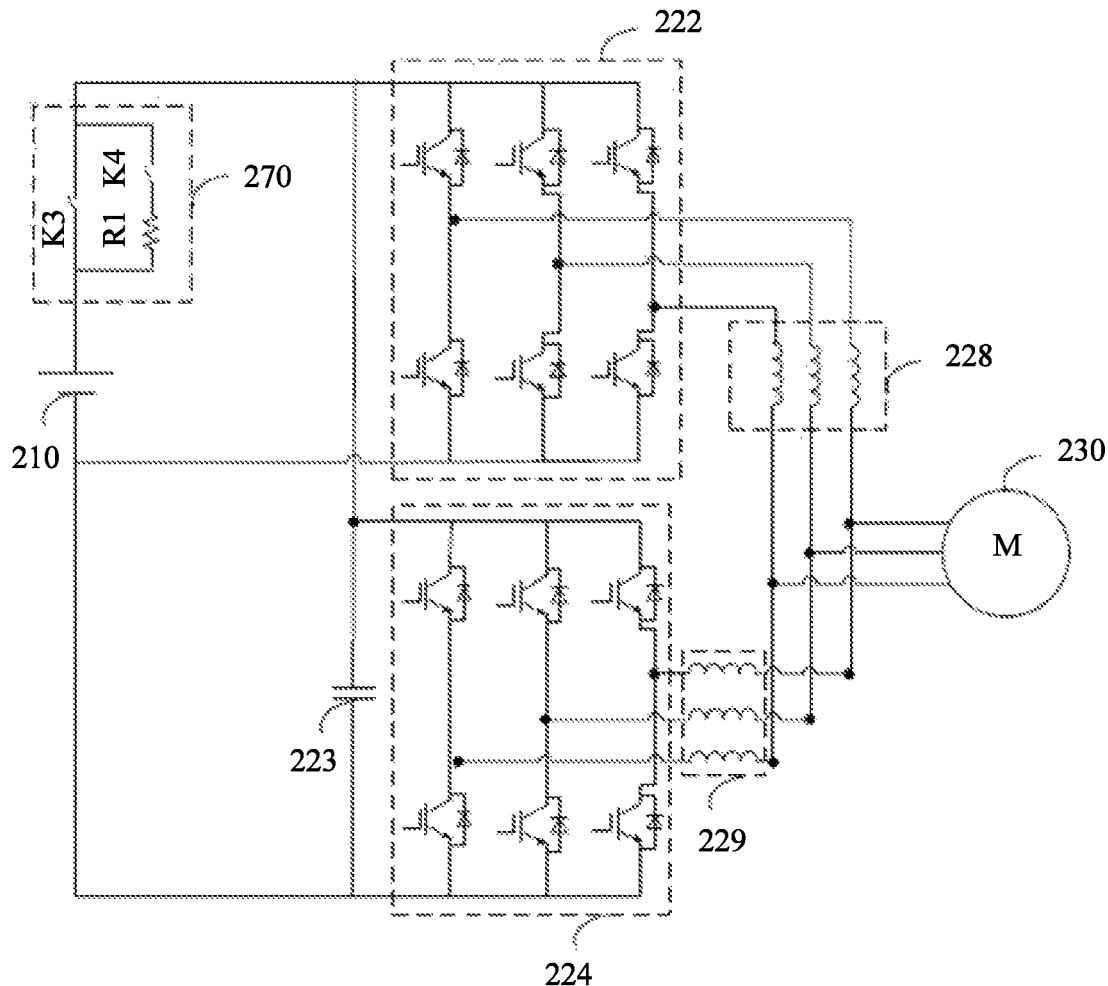
FIG. 15 is a schematic structural diagram of an electric vehicle drive system according to an embodiment of the present invention.

Optionally, referring to FIG. 15, the drive 220 further includes a first constant current inductor 228 and a second constant current inductor 229. One end of the first constant current inductor 228 is connected to the alternating current end of the first conversion module 222, and the other end of the first constant current inductor 228 is connected to the input end of the motor 230. One end of the second constant current inductor 229 is connected to the alternating current end of the second conversion module 224, and the other end of the second constant current inductor 229 is connected to the input end of the motor 230.

A constant current inductor is added between the conversion module and the motor, so that in a process in which the first conversion module 222 and the second conversion module 224 parallelly drive the motor to speed up, the first constant current inductor 228 and the second constant current inductor 229 can restrain a cross current between the first conversion module 222 and the second conversion module 224. In this way, currents that are output by the first conversion module 222 and the second conversion module 224 at each phase are the same.

Figure 16:
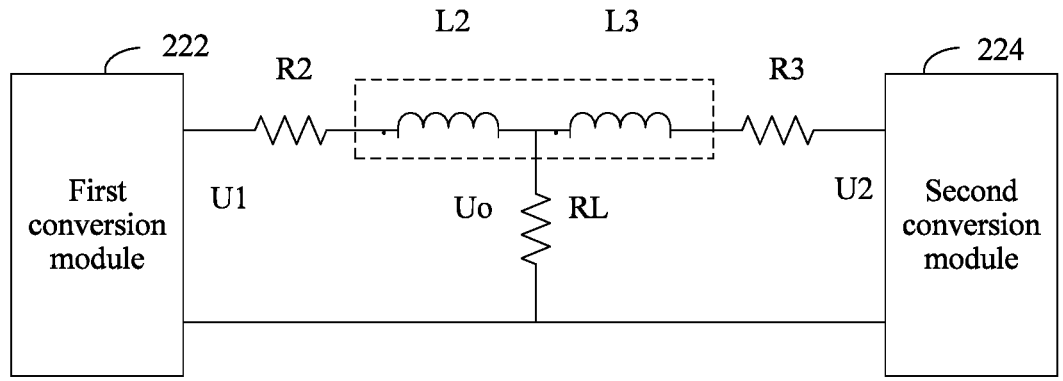
FIG. 16 is an equivalent circuit diagram of a drive system according to an embodiment of the present invention.

For example, after the constant current inductor is added, an equivalent circuit of the drive system in the parallel inversion mode may be shown in FIG. 16. R2 and R3 are respectively line impedance between the first conversion module 222 and the load 290 and line impedance between the second conversion module 224 and the load 290, L2 and L3 are constant current inductors, RL is load impedance, U1 and U2 are respectively output voltages of the first conversion module 222 and the second conversion module 224, and Uo is an end voltage of the load. If the constant current inductors L2 and L3 are not added, when the drive system works in the parallel inversion mode, and when U1 and U2 are inconsistent, that is, there is a voltage difference between the two conversion modules, a relatively great cross current may not pass through the load but flow between the two conversion modules because values of R2 and R3 are small. After the constant current inductors L2 and L3 are added, a cross current caused by a voltage difference in a dynamic or static adjustment process may be effectively restrained, so that the output currents of the first conversion module 222 and the second conversion module 224 are the same.

Figure 17:
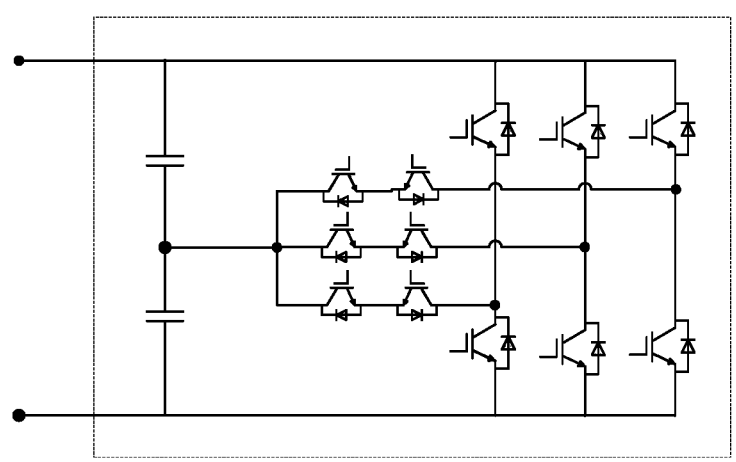
FIG. 17 is a schematic structural diagram of a conversion module with a three-level structure according to an embodiment of the present invention.

It should be noted that, that both the first conversion module 222 and the second conversion module 224 use two-level three-phase full-bridge inverter circuits is merely used as an example for description in this embodiment of the present invention. However, in actual application, the first conversion module 222 may use a two-level three-phase full-bridge inverter circuit, or may use a three-level three-phase full-bridge inverter circuit, and the second conversion module 224 may use a two-level three-phase full-bridge inverter circuit, or may use a three-level three-phase full-bridge inverter circuit. This is not limited in this embodiment of the present invention. A three-level three-phase full-bridge inverter circuit may be shown in FIG. 17.

Figure 18:
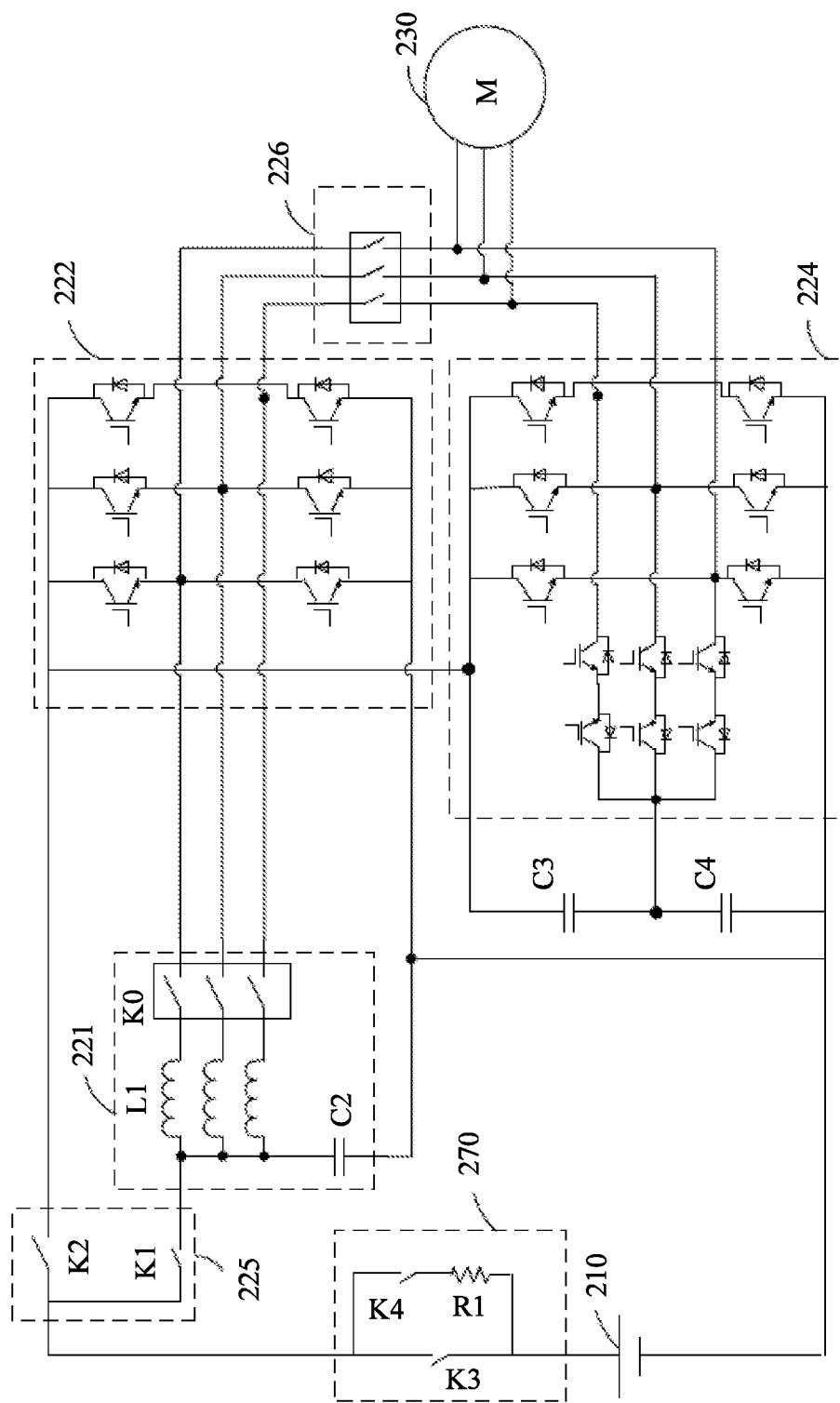
FIG. 18 is a schematic structural diagram of an electric vehicle drive system according to an embodiment of the present invention.
Figure 19:
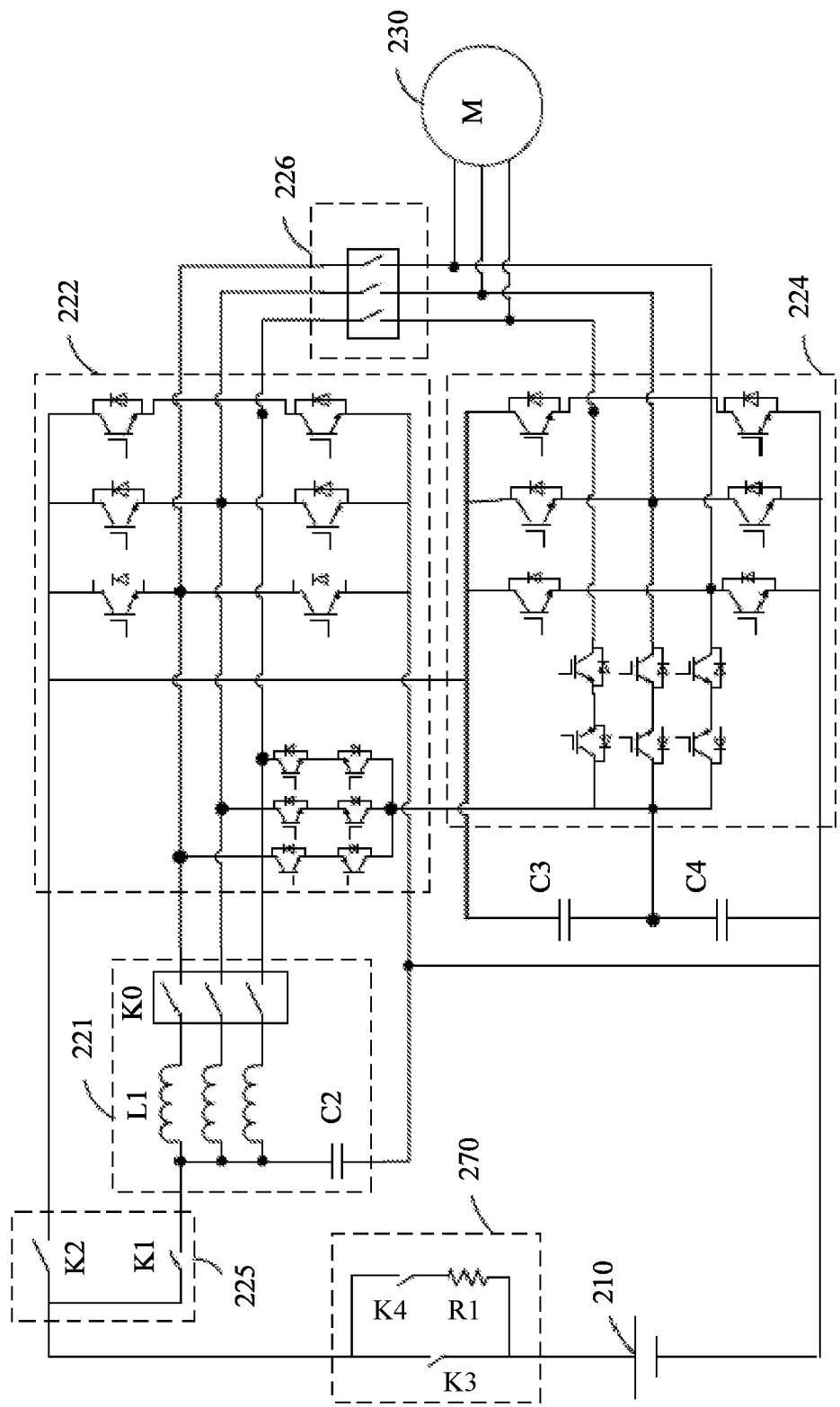
FIG. 19 is a schematic structural diagram of an electric vehicle drive system according to an embodiment of the present invention.

As shown in FIG. 3, both the first conversion module 222 and the second conversion module 224 may use two-level three-phase full-bridge inverter circuits. Alternatively, as shown in FIG. 18, the first conversion module 222 uses a two-level three-phase full-bridge inverter circuit, and the second conversion module 224 uses a three-level three-phase full-bridge inverter circuit. Alternatively, the first conversion module 222 uses a three-level three-phase full-bridge inverter circuit, and the second conversion module 224 uses a two-level three-phase full-bridge inverter circuit. Alternatively, as shown in FIG. 19, both the first conversion module 222 and the second conversion module 224 use three-level three-phase full-bridge inverter circuits, and so on. This is not limited in this embodiment of the present invention.

In conclusion, in this embodiment of the present invention, when the motor of the electric vehicle runs at a high rotation speed, and the end voltage of the motor boosts with the rotation speed of the motor and exceeds the voltage that can be supplied by the power battery, the drive system can boost the voltage of the first capacitor by using the boost circuit including the filtering module and the first conversion module, so as to input a sufficient voltage into the motor to drive the motor to speed up, and expand the speed adjustment range of the electric vehicle. Because the motor is sped up by means of boosting without requiring field weakening control, the output power of the system is increased, and driving efficiency is increased.

Figure 20:
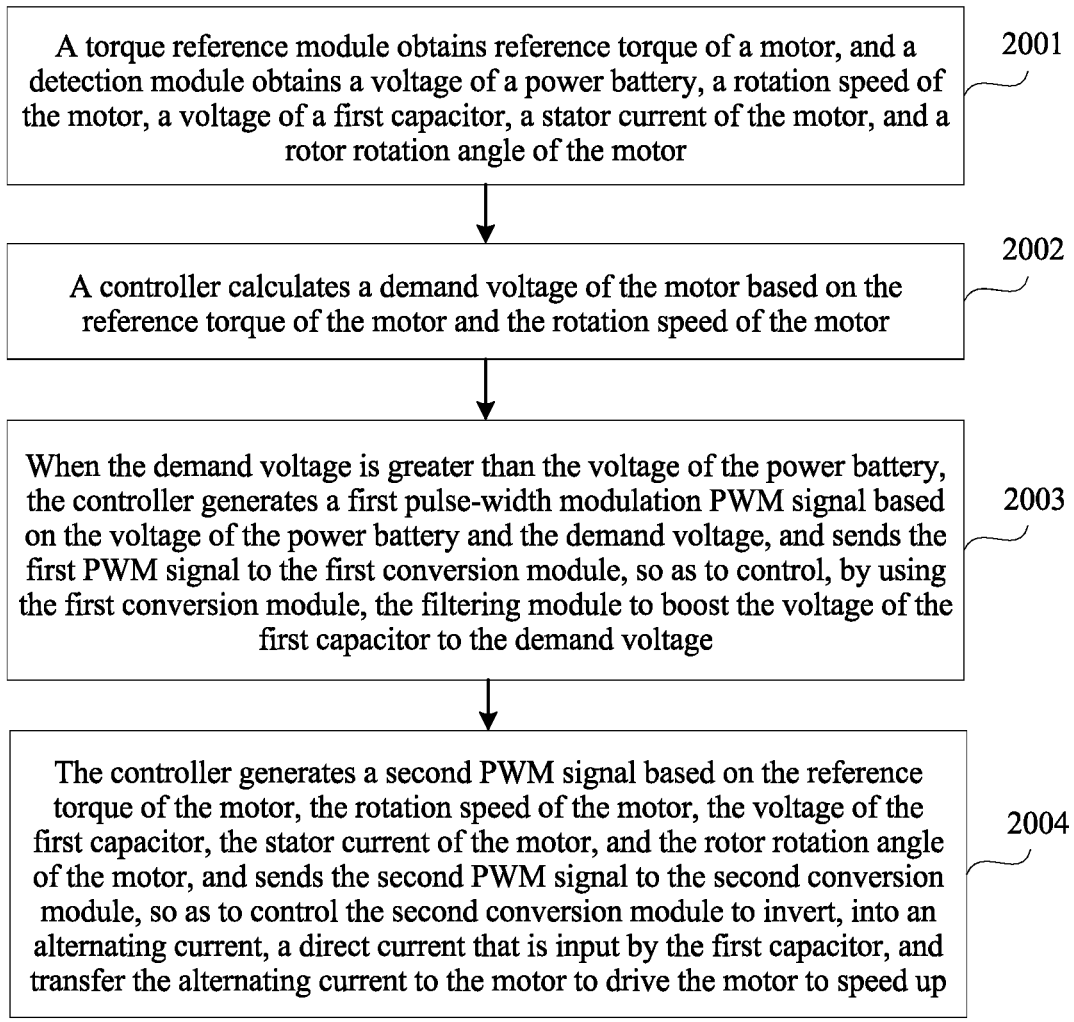
FIG. 20 is a flowchart of an electric vehicle driving method according to an embodiment of the present invention.

FIG. 20 is a flowchart of an electric vehicle driving method according to an embodiment of the present invention. The method is applied to the drive system according to any one of the foregoing embodiments, and referring to FIG. 20, the method includes the following steps.

Step 2001: The torque reference module obtains the reference torque of the motor, and the detection module obtains the voltage of the power battery, the rotation speed of the motor, the voltage of the first capacitor, the stator current of the motor, and the rotor rotation angle of the motor.

Step 2002: The controller calculates the demand voltage of the motor based on the reference torque of the motor and the rotation speed of the motor.

Specifically, the controller may first calculate a d-axis current and a q-axis current of the motor in a space vector based on the reference torque of the motor by using a system torque equation (1):

$$T_e = \frac{3}{2} n_p [i_q \psi_f + (L_d - L_q) i_d i_q], \quad (1)$$

where $i_d$ and $i_q$ are respectively the d-axis current and the q-axis current of the motor, $T_e$ is e the reference torque of the motor, $n_p$ is the quantity of the pole pairs of the motor, $\psi_f$ is the permanent magnet chain of the motor, and $L_d$ and $L_q$ are respectively a d-axis inductance value and a q-axis inductance value of the motor.

A process of calculating the d-axis current and the q-axis current of the motor in the space vector based on the reference torque of the motor by using the system torque equation (1) may include any one of the following manners:

First Manner: Table Lookup.

That is, the controller may pre-calculate a group of allocation values of the reference torque, the d-axis current, and the q-axis current according to the foregoing formula, and store the group of the allocation values of the reference torque, the d-axis current, and the q-axis current in a table. Afterwards, the controller may perform table lookup according to the reference torque to select a corresponding d-axis current and a corresponding q-axis current.

Second Manner: Maximum Torque/Current Ratio Control.

That is, the stator current is controlled according to a principle in which a ratio of reference torque to a current is maximum, so that the stator current is minimum while the reference torque meets a requirement, to increase efficiency. A minimum extremum of the stator current is calculated according to the principle with reference to the formula (1), and allocation formulas of the d-axis current $i_d$ and the q-axis current $i_q$ are as follows:

$$\begin{cases} i_d = \frac{\psi_f}{2(L_q - L_d)} - \sqrt{\frac{(\psi_f)^2}{4(L_q - L_d)^2} + (i_q)^2} \\ i_q = \frac{T_e}{\psi_f + (L_d - L_q) i_d} \end{cases}, \quad (2)$$

where $i_d$ and $i_q$ are respectively the d-axis current and the q-axis current of the motor, $T_e$ is the reference torque of the motor, $n_p$ is the quantity of the pole pairs of the motor, $\psi_f$ is the permanent magnet chain of the motor, and $L_d$ and $L_q$ are respectively the d-axis inductance value and the q-axis inductance value of the motor.

After the d-axis current and the q-axis current of the motor are obtained by means of calculation, the controller may calculate a d-axis end voltage and a q-axis end voltage of the motor based on the d-axis current, the q-axis current, and the rotation speed of the motor by using a voltage equation (3) under vector control:

$$\begin{cases} u_d = R_s i_d - L_q \omega_e i_q + L_d \dfrac{di_d}{dt} \\ u_q = R_s i_q + L_d \omega_e i_d + L_q \dfrac{di_q}{dt} + \omega_e \psi_f \end{cases} \quad (3)$$

where $R_s$ is a stator resistance of the motor, $i_d$ and $i_q$ are respectively the d-axis current and the q-axis current of the motor, $L_d$ and $L_q$ are respectively the d-axis inductance value and the q-axis inductance value of the motor, $\omega_e$ is the rotation speed of the motor, $\psi_f$ is the permanent magnet chain of the motor, and $u_d$ and $u_q$ are respectively the d-axis end voltage and the q-axis end voltage of the motor.

Afterwards, the controller may calculate the demand voltage of the motor based on the d-axis end voltage and the q-axis end voltage of the motor by using a voltage formula (4):

$$U^*_{dc} = \sqrt{3} \cdot \sqrt{u_d^2 + u_q^2} \quad (4),$$

where $u_d$ and $u_q$ are respectively the d-axis end voltage and the q-axis end voltage of the motor, and $U^*_{dc}$ is the demand voltage of the motor.

Step 2003: When the demand voltage is greater than the voltage of the power battery, the controller generates the first pulse-width modulation PWM signal based on the voltage of the power battery and the demand voltage, and sends the first PWM signal to the first conversion module, so as to control, by using the first conversion module, the filtering module to boost the voltage of the first capacitor to the demand voltage.

When the demand voltage is greater than the voltage of the power battery, it indicates that a voltage that is input by the power battery cannot meet a current voltage requirement of the motor, that is, cannot drive the motor to continue to speed up. To drive the motor to continue to speed up, the voltage of the first capacitor is boosted to the demand voltage, that is, a direct current bus voltage of the drive system is boosted in this embodiment of the present invention, so that an output voltage of the drive system can be boosted. In this way, the current voltage requirement of the motor is met, so as to drive the motor to continue to speed up.

Specifically, a process in which the controller generates the first pulse-width modulation PWM signal based on the voltage of the power battery and the demand voltage may include:

calculating, by the controller, a ratio of the demand voltage of the motor to the voltage of the power battery, and determining the ratio as a boost ratio of the drive system; calculating a duty cycle of the first PWM signal according to the boost ratio; and generating the first PWM signal according to the duty cycle.

The controller may calculate the boost ratio of the drive system by using a formula (5):

$$B = \dfrac{U^*_{dc}}{U_{dc}}, \quad (5)$$

where

B is the boost ratio of the drive system, $U_{dc}$ is the voltage of the power battery, and $U^*_{dc}$ is the demand voltage of the motor.

After obtaining the boost ratio by means of calculation, the controller may calculate the duty cycle of the first PWM signal by using a formula (6):

$$D = \dfrac{B-1}{B}, \quad (6)$$

where

D is the duty cycle of the first PWM signal, and B is the boost ratio of the drive system.

Afterwards, the controller may generate the first PWM signal according to the duty cycle of the first PWM signal that is obtained by means of calculation.

Step 2004: The controller generates the second PWM signal based on the reference torque of the motor, the rotation speed of the motor, the voltage of the first capacitor, the stator current of the motor, and the rotor rotation angle of the motor, and sends the second PWM signal to the second conversion module, so as to control the second conversion module to invert, into the alternating current, the direct current that is input by the first capacitor, and transfer the alternating current to the motor to drive the motor to speed up.

The controller may generate the second PWM signal based on the reference torque of the motor, the rotation speed of the motor, the voltage of the first capacitor, the stator current of the motor, and the rotor rotation angle of the motor by using an SVPWM control policy. For a specific process of generating the second PWM signal by using the SVPWM control policy, refer to a related technology. Details are not described in this embodiment of the present invention.

In this embodiment of the present invention, when the demand voltage of the motor is greater than the voltage of the power battery, the drive system may boost the voltage of the first capacitor to the demand voltage by using the boost circuit including the filtering module and the first conversion module. The voltage of the first capacitor has been boosted to the demand voltage. Therefore, when the second conversion module inverts, into the alternating current, the direct current that is input by the first capacitor, and transfers the alternating current to the motor, the motor can be driven to continue to speed up, so as to expand the speed adjustment range of an electric vehicle. In addition, because the motor is sped up by means of boosting without requiring field weakening control, output power of the system is increased, and driving efficiency is increased.

In actual application, when the motor runs at a high speed, the demand voltage is usually greater than the voltage of the power battery. Therefore, when the motor runs at a high speed, the drive system may work in the boosting inversion mode. That is, a working mode in which the filtering module and the first conversion module form the boost circuit for boosting, and the second conversion module performs inversion. In addition, in this embodiment of the present invention, the boost ratio of the drive system may be flexibly adjusted according to current reference torque and a current rotation speed of the motor. Therefore, when the rotation speed of the motor is high, the boost ratio of the drive system may be increased, and when the rotation speed of the motor is low, the boost ratio of the drive system may be reduced.

Moreover, when the drive system further includes the input switching module and the first output switching module, the drive system may further perform mode switching according to the demand voltage of the motor.

In a first manner, when the demand voltage is greater than the voltage of the power battery, by using the controller, the drive system may switch the input switching module to the first switching state, and switch the first output switching module to the third switching state. The first switching state is a state in which the positive electrode of the power battery is connected to the input end of the filtering module, and the positive electrode of the power battery is open from the direct current input end of the first conversion module. The third switching state is a state in which the alternating current end of the first conversion module is open from the input end of the motor.

The controller switches the switching states of the input switching module and the first output switching module, so as to control the drive system to work in the boosting inversion mode.

In a second manner, when the demand voltage of the motor is less than or equal to the voltage of the power battery, by using the controller, the drive system may further switch the input switching module to the second switching state, and switch the first output switching module to the fourth switching state. The second switching state is a state in which the positive electrode of the power battery is connected to the direct current input end of the first conversion module, and the positive electrode of the power battery is open from the input end of the filtering module. The fourth switching state is a state in which the alternating current end of the first conversion module is connected to the input end of the motor. The controller generates the second PWM signal based on the reference torque of the motor, the rotation speed of the motor, the voltage of the first capacitor, the stator current of the motor, and the rotor rotation angle of the motor, and sends the second PWM signal to the first conversion module and the second conversion module. The controller controls, by using the second PWM signal, the first conversion module to invert, into the first alternating current, the direct current that is input by the first capacitor, and output the first alternating current to the motor; and controls, by using the second PWM signal, the second conversion module to invert, into the second alternating current, the direct current that is input by the first capacitor, and output the second alternating current to the motor, so that the first conversion module and the second conversion module parallelly drive the motor to speed up.

For a process in which the controller generates the second PWM signal based on the reference torque of the motor, the rotation speed of the motor, the voltage of the first capacitor, the stator current of the motor, and the rotor rotation angle of the motor, refer to the process of generating the first PWM signal. Details are not described in this embodiment of the present invention again.

In a process of performing inversion control on the first conversion module and the second conversion module, the controller may perform independent control, that is, separately control the first conversion module and the second conversion module based on two separate pieces of SVPWM control, or may perform parallel control, that is, control both the first conversion module and the second conversion module based on one piece of SVPWM control. This is not limited in this embodiment of the present invention.

It should be noted that during parallel control, information such as the reference torque of the motor, the rotation speed of the motor, the voltage of the first capacitor, the stator current of the motor, and the rotor rotation angle of the motor may be collected, and six PWM signals are separately generated according to the collected information and based on a same piece of SVPWM control, so as to separately control the first conversion module and the second conversion module to invert, into the alternating current, the direct current that is input by the first capacitor, and output the alternating current to the motor to drive the motor to run. Therefore, the controller requires only one SVPWM control system and requires a small quantity of hardware, and the controller has a small volume. Therefore, parallel control is preferably performed on the first conversion module and the second conversion module. In addition, the controller sends a same PWM signal to the two conversion modules during parallel control. This is conducive to current equalization by the drive system. Therefore, a constant current inductor may not need to be added between the conversion module and the motor during parallel control, and this improves working performance of the system.

In a third manner, when the demand voltage of the motor is less than or equal to the voltage of the power voltage, the controller calculates a demand stator current of the motor based on the reference torque of the motor. When the demand stator current of the motor is less than or equal to a maximum output current of the second conversion module, the controller switches the input switching module to the second switching state, and switches the first output switching module to the third switching state. When the demand stator current of the motor is greater than the maximum output current of the second conversion module, the controller switches the input switching module to the second switching state, and switches the first output switching module to the fourth switching state.

The maximum output current of the second conversion module indicates a maximum current that can be output by the second conversion module, is a fixed parameter of the second conversion module, and is determined by a structure and performance of the second conversion module. Therefore, the controller may directly search a parameter list of the second conversion module for the maximum output current of the second conversion module, or may directly obtain the maximum output current of the second conversion module that is input, and so on. A manner of obtaining the maximum output current of the second conversion module is not limited in this embodiment of the present invention.

The controller may calculate the d-axis current and the q-axis current of the motor in the space vector based on the reference torque of the motor by using the system torque equation (1). For a specific calculation process, refer to the foregoing related description. Details are not described in this embodiment of the present invention again.

After the d-axis current and the q-axis current of the motor are obtained by means of calculation, the controller may calculate the demand stator current of the motor by using the following formula:

$$i_s = \sqrt{i_d^2 + i_q^2} \qquad (7),\text{ where}$$

$i_s$ is the demand stator current of the motor, and $i_d$ and $i_q$ are respectively the d-axis current and the q-axis current of the motor.

After the demand stator current of the motor is obtained by means of calculation, the controller may compare the demand stator current of the motor with the maximum output current of the second conversion module. Certainly, if a structure and performance of the first conversion module are the same as those of the second conversion module, that is, maximum output currents are the same, the controller may further compare the demand stator current of the motor with the maximum output current of the first conversion module. This is not limited in this embodiment of the present invention. It should be noted that an example in which the structure and the performance of the first conversion module are the same as those of the second conversion module is used in this embodiment of the present invention. Therefore, the demand stator current of the motor may be compared with the maximum output current of either of the conversion modules. This is not limited in this embodiment of the present invention.

When the demand stator current of the motor is less than or equal to the maximum output current of the second conversion module, it indicates that one conversion module can output a sufficient current to the motor, and the motor can output sufficient torque to speed up. In this case, the controller may switch the drive system to the single inversion mode, that is, a mode in which the first conversion module does not work, and only the second conversion module performs inversion, so as to save energy resources of the drive system, and improve working performance of the system.

When the demand stator current of the motor is greater than the maximum output current of the second conversion module, it indicates that one conversion module is insufficient to output a sufficient current to the motor, and the motor cannot output sufficient torque to speed up. In this case, the controller may switch the drive system to the parallel inversion mode, that is, a mode in which both the first conversion module and the second conversion module work in the inversion state, so as to separately input a three-phase current into the motor, and parallelly drive the motor to speed up. A current that is input by the drive into the motor in the parallel inversion mode is twice a current that is input by the drive into the motor in the single inversion mode. Therefore, output torque of the motor can be doubled. In this way, when the drive system works in a low-speed and heavy-load working condition, a requirement of the drive system for a low speed and large torque may be met, so that the electric vehicle can be sped up to a relatively high rotation speed in a short time to reduce 100-kilometer speedup duration of the electric vehicle, and improve working performance of the system.

When the input switching module includes the first switch and the second switch, that the controller switches the input switching module to the first switching state includes: closing, by the controller, the first switch, and opening the second switch, so as to switch the input switching module to the first switching state. Correspondingly, that the controller switches the input switching module to the second switching state includes: opening, by the controller, the first switch, and closing the second switch, so as to switch the input switching module to the second switching state.

Further, when the drive system further includes the second output switching module, when the demand voltage of the motor is greater than the voltage of the power battery, the controller switches the second output switching module to the fifth switching state. The fifth switching state is a state in which the alternating current end of the second conversion module is connected to the input end of the motor. In a process in which the first conversion module and the second conversion module parallelly drive the motor to speed up, when the first conversion module is faulty, the controller switches the first output switching module to the third switching state, and when the second conversion module is faulty, the controller switches the second output switching module to the sixth switching state. The sixth switching state is a state in which the alternating current end of the second conversion module is open from the input end of the motor.

When the drive system works in the parallel inversion mode, if either of the conversion modules is faulty, one conversion module that is faulty is removed, and the other conversion module can continue to run after load reduction. Therefore, redundancy control of the drive system can be implemented, and security and reliability of the drive system are increased. By means of redundancy control, in a process in which the electric vehicle travels, the vehicle is not out of control and can still safely travel after speed reduction and load reduction if a fault occurs.

In addition, when the drive further includes the second output switching module, based on the single inversion mode, the drive system further needs to switch the second output switching module to the fifth switching state by using the controller. In addition, when the demand voltage of the motor is greater than the voltage of the power battery, by using the controller, the drive system may further switch the input switching module to the second switching state, switch the first output switching module to the fourth switching state, and switch the second output switching module to the sixth switching state, so that the drive system works in the single inversion mode. In this case, the positive electrode of the power battery is open from the input end of the filtering module, the positive electrode of the power battery is connected to the alternating current end of the first conversion module, the alternating current end of the first conversion module is connected to the motor, and the alternating current end of the second conversion module is open from the motor. Therefore, the second conversion module does not work, and only the first conversion module works in the inversion state.

A second input switching module is added between the second conversion module and the motor, so that switching of the single inversion mode of the drive system can be more flexible.

In addition, when the filtering module includes the N boost switches, when the demand voltage of the motor is less than or equal to the voltage of the power battery, that the controller switches the input switching module to the second switching state, and switches the first output switching module to the fourth switching state further includes: when the demand voltage of the motor is less than or equal to the voltage of the power battery, switching, by the controller, the input switching module to the second switching state, switching the first output switching module to the fourth switching state, and opening the N boost switches.

The N boost switches are opened, so as to avoid a short circuit of the first three-phase inverter unit caused by connection of the alternating current end of the first three-phase inverter unit to the negative electrode of the power battery that is performed by using the filtering module.

Optionally, when the drive system further includes the soft start module, and when the drive is started, the drive system may further start the soft start module by using the controller, so as to control the power battery to gradually charge the first capacitor.

Further, when the soft start module includes the third switch, the fourth switch, and the current-limiting resistor, and when the drive is started, that the soft start module is started by using the controller, so as to control the power battery to gradually charge the first capacitor includes: when the drive is started, closing, by the controller, the fourth switch, and charging, by the power battery, the first capacitor by using the current-limiting resistor; and when the voltage of the first capacitor is greater than a preset voltage, opening, by the controller, the fourth switch, and closing the third switch.

The preset voltage approaches the voltage of the power battery, and may be a percentage of the voltage of the power battery. The percentage may be 80%, 90%, 95%, or the like. This is not limited in this embodiment of the present invention.

According to the method in this embodiment of the present invention, a risk that the first capacitor is damaged when a relatively great voltage of the power battery is directly applied to the bus is avoided, and security and reliability of the system are increased.

In addition, the drive system may further implement feedback braking of the electric vehicle by using the circuit structure and the control logic in this embodiment of the present invention. When the electric vehicle slows down or brakes, the drive system may further drive the motor to work in the power generation state. Energy of the first conversion module and that of the second conversion module are controlled to reversely flow, so as to charge the power battery to implement braking energy feedback. In this way, energy of the drive system can be saved, and endurance mileage of the electric vehicle can be extended.

It should be noted that, that both the first conversion module and the second conversion module use two-level three-phase full-bridge inverter circuits is merely used as an example for description in this embodiment of the present invention. However, in actual application, the first conversion module or the second conversion module may also use a three-level three-phase full-bridge inverter circuit. For example, the first conversion module uses a two-level three-phase full-bridge inverter circuit, and the second conversion module uses a three-level three-phase full-bridge inverter circuit. Alternatively, the first conversion module uses a three-level three-phase full-bridge inverter circuit, and the second conversion module uses a two-level three-phase full-bridge inverter circuit. Alternatively, both the first conversion module and the second conversion module use three-level three-phase full-bridge inverter circuits, and so on. This is not limited in this embodiment of the present invention.

Regardless of whether the first conversion module or the second conversion module uses a three-level three-phase full-bridge inverter circuit, a control procedure of the drive system is the same as that of the foregoing embodiment. A difference is that in an inversion process, when a PWM signal is sent to a conversion module using the three-level three-phase full-bridge inverter circuit, a three-level control policy needs to be used to generate the PWM signal.

In conclusion, in a driving manner provided in this embodiment of the present invention, when the demand voltage of the motor is greater than the voltage of the power battery, the drive system may boost the voltage of the first capacitor to the demand voltage by using the boost circuit including the filtering module and the first conversion module. The voltage of the first capacitor has been boosted to the demand voltage. Therefore, when the second conversion module inverts, into the alternating current, the direct current that is input by the first capacitor, and transfers the alternating current to the motor, the motor can be driven to continue to speed up, so as to expand the speed adjustment range of the electric vehicle. In addition, because the motor is sped up by means of boosting without requiring field weakening control, the output power of the system is increased, and the driving efficiency is increased.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely embodiments of this application, but are not intended to limit this application. Any modification, equivalent replacement, or improvement made without departing from the principle of this application should fall within the protection scope of this application.

What is claimed is:
1. An electric vehicle drive system, comprising:
a power battery;
a drive;
a motor;
a detection module;
a torque reference module;
an input switching module and a first output switching module; and
a controller,
wherein the drive comprises a filtering module, a first conversion module, a first capacitor, and a second conversion module;
a positive electrode of the power battery is connected to an input end of the filtering module, a first output end of the filtering module is connected to an alternating current end of the first conversion module, and a second output end of the filtering module is connected to a negative electrode of the power battery;
a direct current input end of the first conversion module is separately connected to one end of the first capacitor and a direct current input end of the second conversion module, and the other end of the first capacitor, a direct current output end of the first conversion module, and a direct current output end of the second conversion module are separately connected to the negative electrode of the power battery; and
an alternating current end of the second conversion module is connected to an input end of the motor, an output end of the motor is connected to a first input end of the detection module, a second input end of the detection module is connected to the one end of the first capacitor, a third input end of the detection module is connected to the positive electrode of the power battery, an output end of the detection module and an output end of the torque reference module are separately connected to an input end of the controller, and an output end of the controller is separately connected to a control end of the first conversion module and a control end of the second conversion module;
wherein a first input end of the input switching module is connected to the positive electrode of the power battery, a first output end of the input switching module is connected to the input end of the filtering module, a second output end of the input switching module is separately connected to the direct current input end of the first conversion module, the one end of the first capacitor, and the direct current input end of the second conversion module;
a first input end of the first output switching module is connected to the alternating current end of the first conversion module, and an output end of the first output switching module is connected to the input end of the motor; and
the output end of the controller is separately connected to a second input end of the input switching module and a second input end of the first output switching module.

2. The drive system according to claim 1, wherein the input switching module comprises a first switch and a second switch; and
one end of the first switch and one end of the second switch are separately connected to the positive electrode of the power battery, the other end of the first switch is connected to the input end of the filtering module, and the other end of the second switch is connected to the direct current input end of the first conversion module.

3. The drive system according to claim 1, wherein the drive further comprises a second output switching module;
a first input end of the second output switching module is connected to the alternating current end of the second conversion module, and an output end of the second output switching module is connected to the input end of the motor; and
the output end of the controller is connected to a second input end of the second output switching module.

4. The drive system according to claim 1, wherein the drive system further comprises a soft start module; and
a first input end of the soft start module is connected to the positive electrode of the power battery, an output end of the soft start module is connected to an input end of the drive, and the output end of the controller is connected to a second input end of the soft start module.

5. The drive system according to claim 4, wherein the soft start module comprises a third switch, a fourth switch, and a current-limiting resistor;
an input end of the third switch is connected to the positive electrode of the power battery, and an output end of the third switch is connected to the input end of the drive;
one end of the current-limiting resistor is connected to the positive electrode of the power battery, the other end of the current-limiting resistor is connected to an input end of the fourth switch, and an output end of the fourth switch is connected to the input end of the drive; and
the output end of the controller is separately connected to a control end of the third switch and a control end of the fourth switch.

6. The drive system according to claim 1, wherein the filtering module comprises a second capacitor and N boost inductors, and N is a positive integer;
an input end of the second capacitor is connected to the positive electrode of the power battery, and an output end of the second capacitor is connected to the negative electrode of the power battery; and
input ends of the N boost inductors are separately connected to the positive electrode of the power battery, and output ends of the N boost inductors are separately connected to the alternating current end of the first conversion module.

7. The drive system according to claim 6, wherein the filtering module further comprises N boost switches, and the N boost switches are one-to-one corresponding to the N boost inductors;
input ends of the N boost switches are separately connected to the output ends of the N boost inductors correspondingly, and output ends of the N boost switches are connected to the alternating current end of the first conversion module; and
the output end of the controller is connected to control ends of the N boost switches.

8. An electric vehicle driving method, comprises:
obtaining, by a torque reference module, reference torque of a motor, and obtaining, by the detection module, a voltage of the power battery, a rotation speed of the motor, a voltage of the first capacitor, a stator current of the motor, and a rotor rotation angle of the motor;
calculating, by a controller, a demand voltage of the motor based on the reference torque of the motor and the rotation speed of the motor;
when the demand voltage is greater than the voltage of the power battery, generating, by the controller, a first pulse-width modulation (PWM) signal based on the voltage of the power battery and the demand voltage, and sending the first PWM signal to the first conversion module, so as to control, by using the first conversion module, the filtering module to boost the voltage of the first capacitor to the demand voltage; and
generating, by the controller, a second PWM signal based on the reference torque of the motor, the rotation speed of the motor, the voltage of the first capacitor, the stator current of the motor, and the rotor rotation angle of the motor, and sending the second PWM signal to the second conversion module, so as to control the second conversion module to invert, into an alternating current, a direct current that is input by the first capacitor, and transfer the alternating current to the motor to drive the motor to speed up.

9. The method according to claim 8, wherein the generating, by the controller, a first pulse-width modulation PWM signal based on the voltage of the power battery and the demand voltage comprises:
calculating, by the controller, a ratio of the demand voltage of the motor to the voltage of the power battery, and determining the ratio as a boost ratio of the drive system;
calculating a duty cycle of the first PWM signal according to the boost ratio; and
generating the first PWM signal according to the duty cycle.

10. The method according to claim 8, wherein when the drive system further comprises the input switching module and the first output switching module, before the generating, by the controller, a first pulse-width modulation PWM signal based on the voltage of the power battery and the demand voltage, the method further comprises:
switching, by the controller, the input switching module to a first switching state, and switching the first output switching module to a third switching state, wherein the first switching state is a state in which the positive electrode of the power battery is connected to the input end of the filtering module, and the positive electrode of the power battery is open from the direct current input end of the first conversion module, and the third switching state is a state in which the alternating current end of the first conversion module is open from the input end of the motor.

11. The method according to claim 10, wherein when the drive system further comprises the second output switching module, the method further comprises:
- when the demand voltage of the motor is greater than the voltage of the power battery, switching, by the controller, the second output switching module to a fifth switching state, wherein the fifth switching state is a state in which the alternating current end of the second conversion module is connected to the input end of the motor; and
- in a process in which the first conversion module and the second conversion module parallelly drive the motor to speed up, when the first conversion module is faulty, switching, by the controller, the first output switching module to the third switching state, and when the second conversion module is faulty, switching, by the controller, the second output switching module to a sixth switching state, wherein the sixth switching state is a state in which the alternating current end of the second conversion module is open from the input end of the motor.

12. The method according to claim 10, wherein when the input switching module comprises the first switch and the second switch, the switching, by the controller, the input switching module to a first switching state comprises:
- closing, by the controller, the first switch, and opening the second switch, so as to switch the input switching module to the first switching state; and
- correspondingly, the switching, by the controller, the input switching module to a second switching state comprises:
- opening, by the controller, the first switch, and closing the second switch, so as to switch the input switching module to the second switching state.

13. The method according to a claim 8, wherein when the drive system further comprises the input switching module and the first output switching module, the method further comprises:
- when the demand voltage of the motor is less than or equal to the voltage of the power battery, switching, by the controller, the input switching module to a second switching state, and switching the first output switching module to a fourth switching state, wherein the second switching state is a state in which the positive electrode of the power battery is connected to the direct current input end of the first conversion module, and the positive electrode of the power battery is open from the input end of the filtering module, and the fourth switching state is a state in which the alternating current end of the first conversion module is connected to the input end of the motor;
- generating, by the controller, the second PWM signal based on the reference torque of the motor, the rotation speed of the motor, the voltage of the first capacitor, the stator current of the motor, and the rotor rotation angle of the motor, and sending the second PWM signal to the first conversion module and the second conversion module; and
- controlling, by using the second PWM signal, the first conversion module to invert, into a first alternating current, the direct current that is input by the first capacitor, and output the first alternating current to the motor; and controlling, by using the second PWM signal, the second conversion module to invert, into a second alternating current, the direct current that is input by the first capacitor, and output the second alternating current to the motor, so that the first conversion module and the second conversion module parallelly drive the motor to speed up.

14. The method according to claim 8, wherein when the drive system further comprises the input switching module and the first output switching module, the method further comprises:
- when the demand voltage of the motor is less than or equal to the voltage of the power voltage, calculating, by the controller, a demand stator current of the motor based on the reference torque of the motor;
- when the demand stator current of the motor is less than or equal to a maximum output current of the second conversion module, switching, by the controller, the input switching module to the first switching state, and switching the first output switching module to the third switching state; and
- when the demand stator current of the motor is greater than the maximum output current of the second conversion module, switching, by the controller, the input switching module to the second switching state, and switching the first output switching module to the fourth switching state.

\* \* \* \* \*

UNITED STATES PATENT AND TRADEMARK OFFICE
CERTIFICATE OF CORRECTION

PATENT NO. : 10,707,801 B2  
APPLICATION NO. : 16/225209  
DATED : July 7, 2020  
INVENTOR(S) : Yi et al.

Page 1 of 1

It is certified that error appears in the above-identified patent and that said Letters Patent is hereby corrected as shown below:

In the Specification

In Column 15, Line 45, delete "a opening" and insert -- an opening --, therefor.

In Column 15, Line 56, delete "a opening" and insert -- an opening --, therefor.

In the Claims

In Column 35, in Claim 13, Line 35, delete "to a" and insert -- to --, therefor.

Signed and Sealed this
Eleventh Day of October, 2022

Katherine Kelly Vidal
*Director of the United States Patent and Trademark Office*